Aug. 11, 1959
T. T. BUNCH
2,899,142
ARTICLE HANDLING APPARATUS
Filed April 5, 1957
14 Sheets-Sheet 1
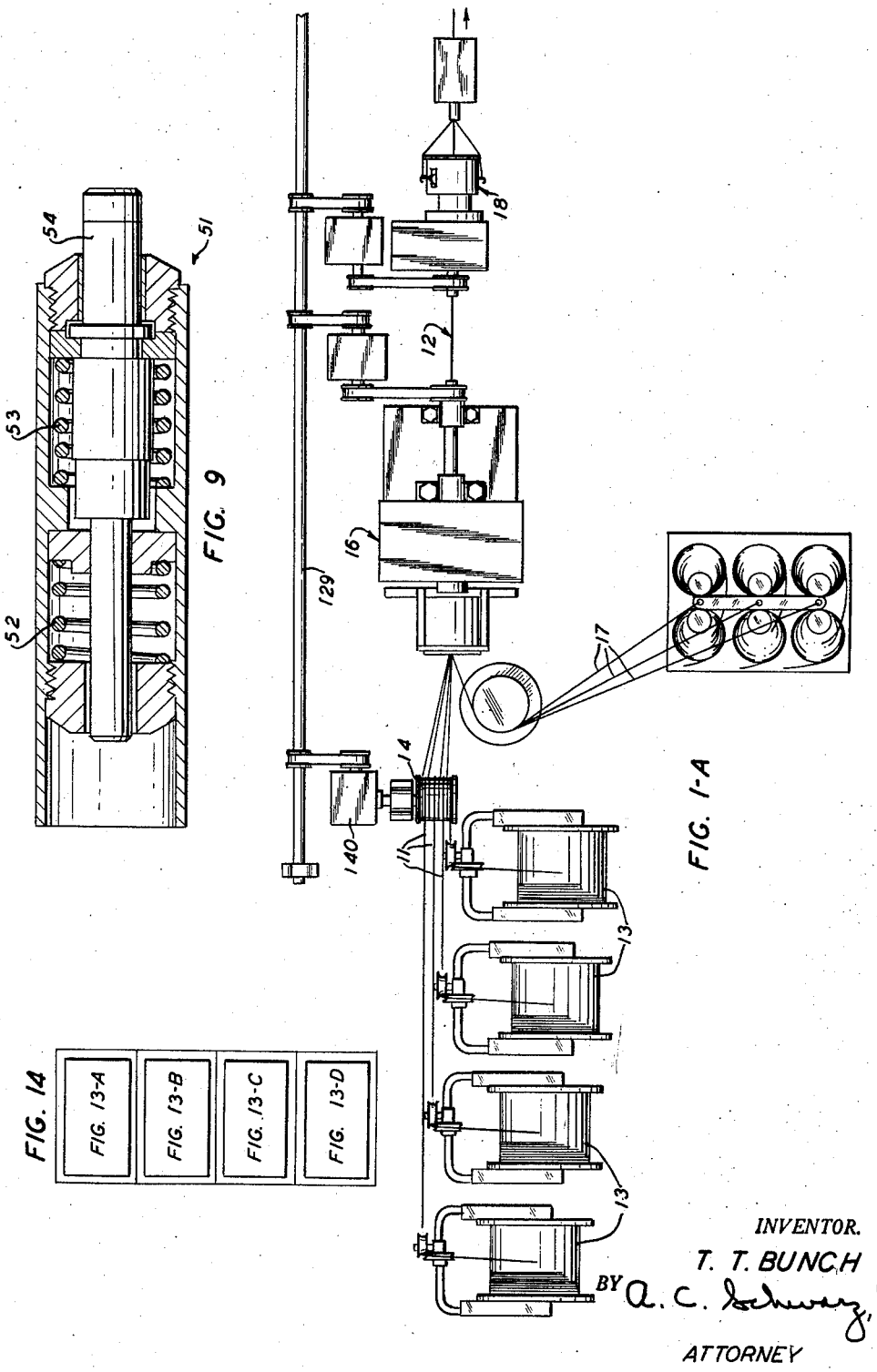
INVENTOR.
T. T. BUNCH
BY A. C. Schwarz, Jr.
ATTORNEY

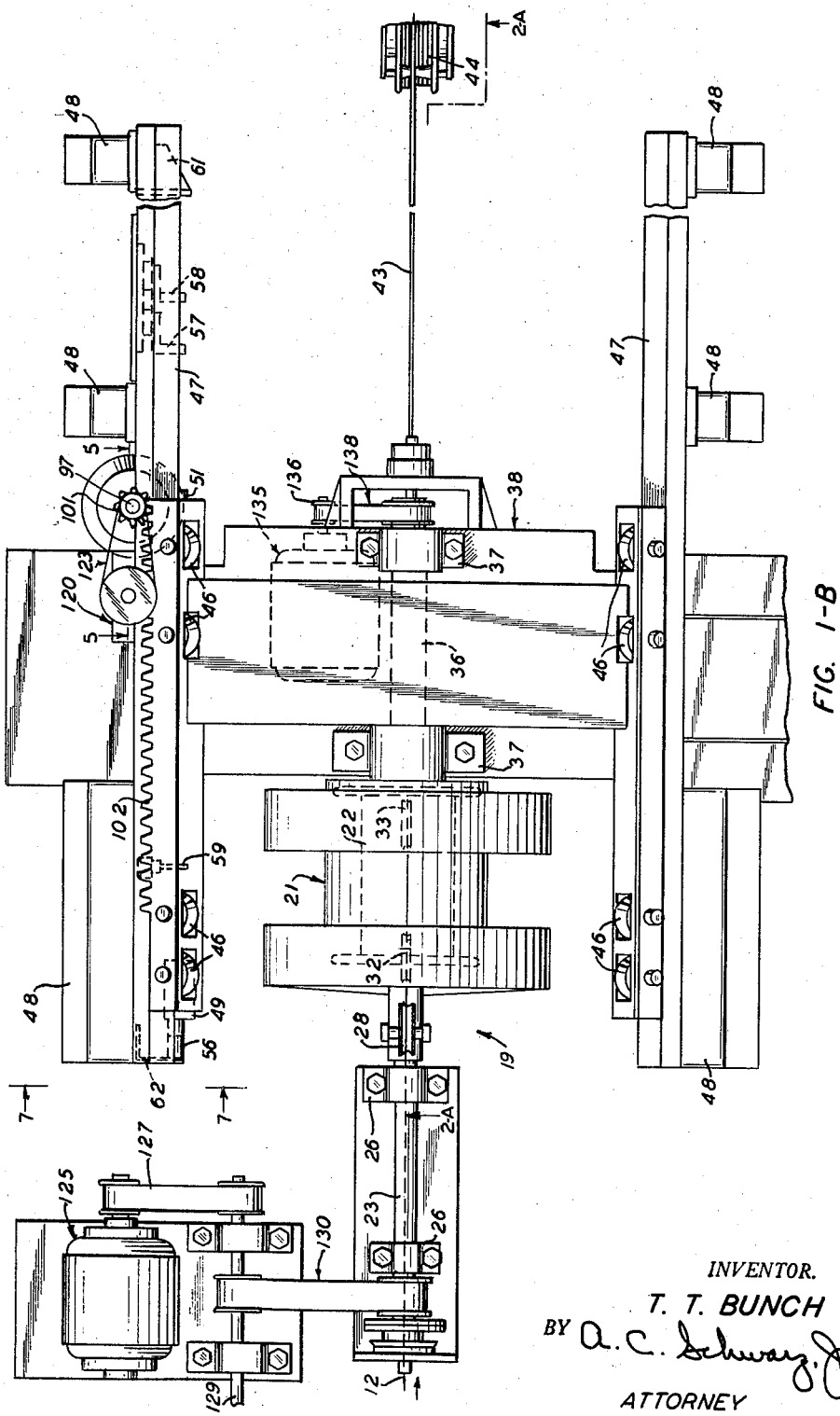

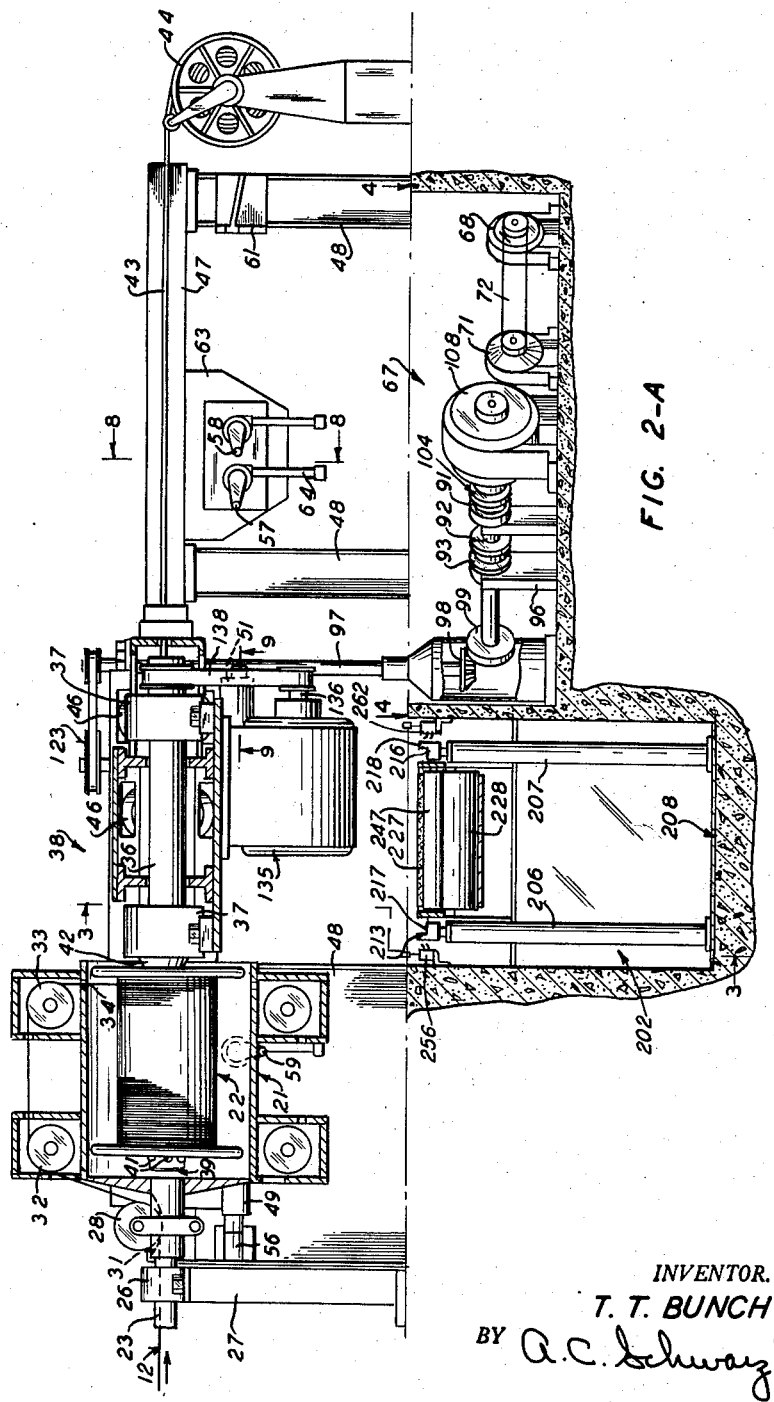

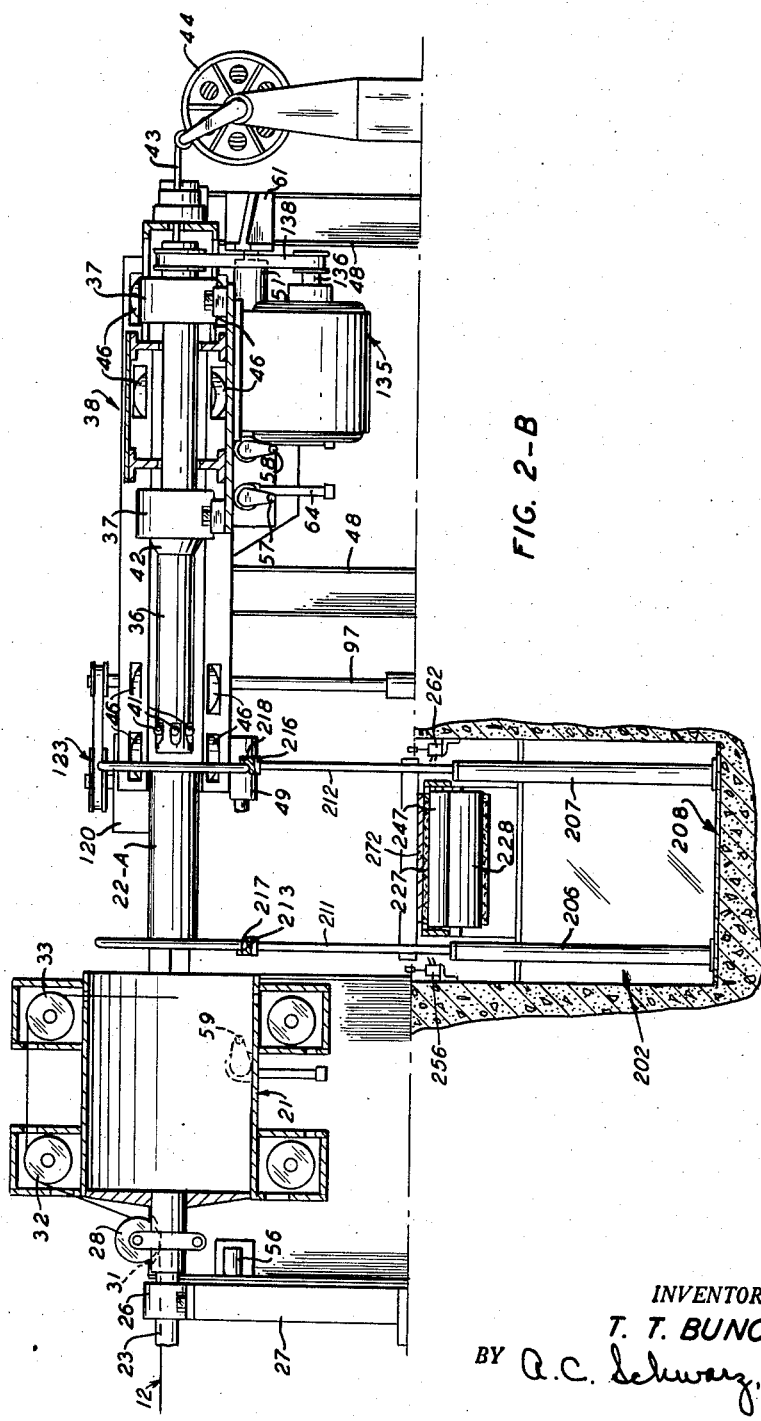

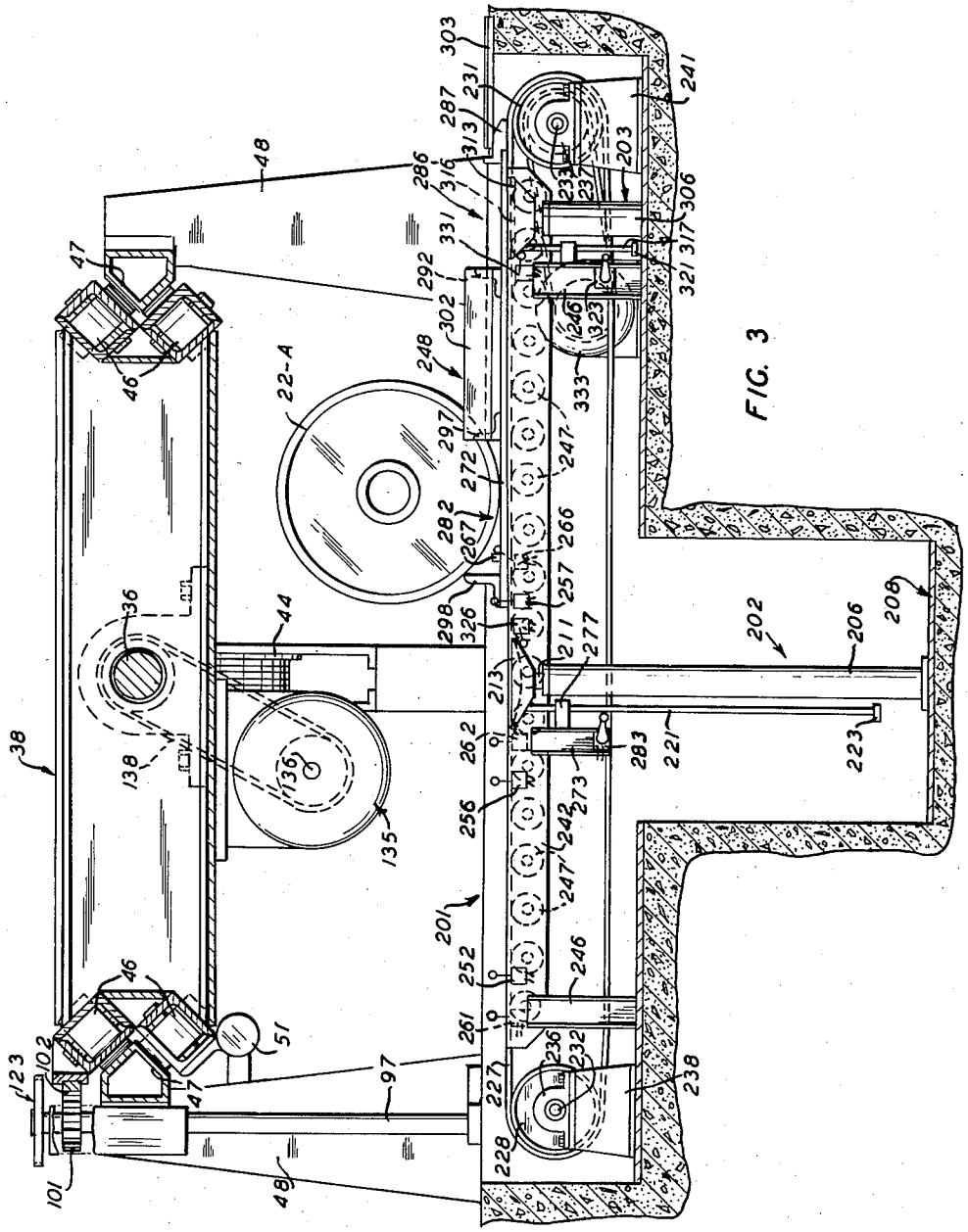

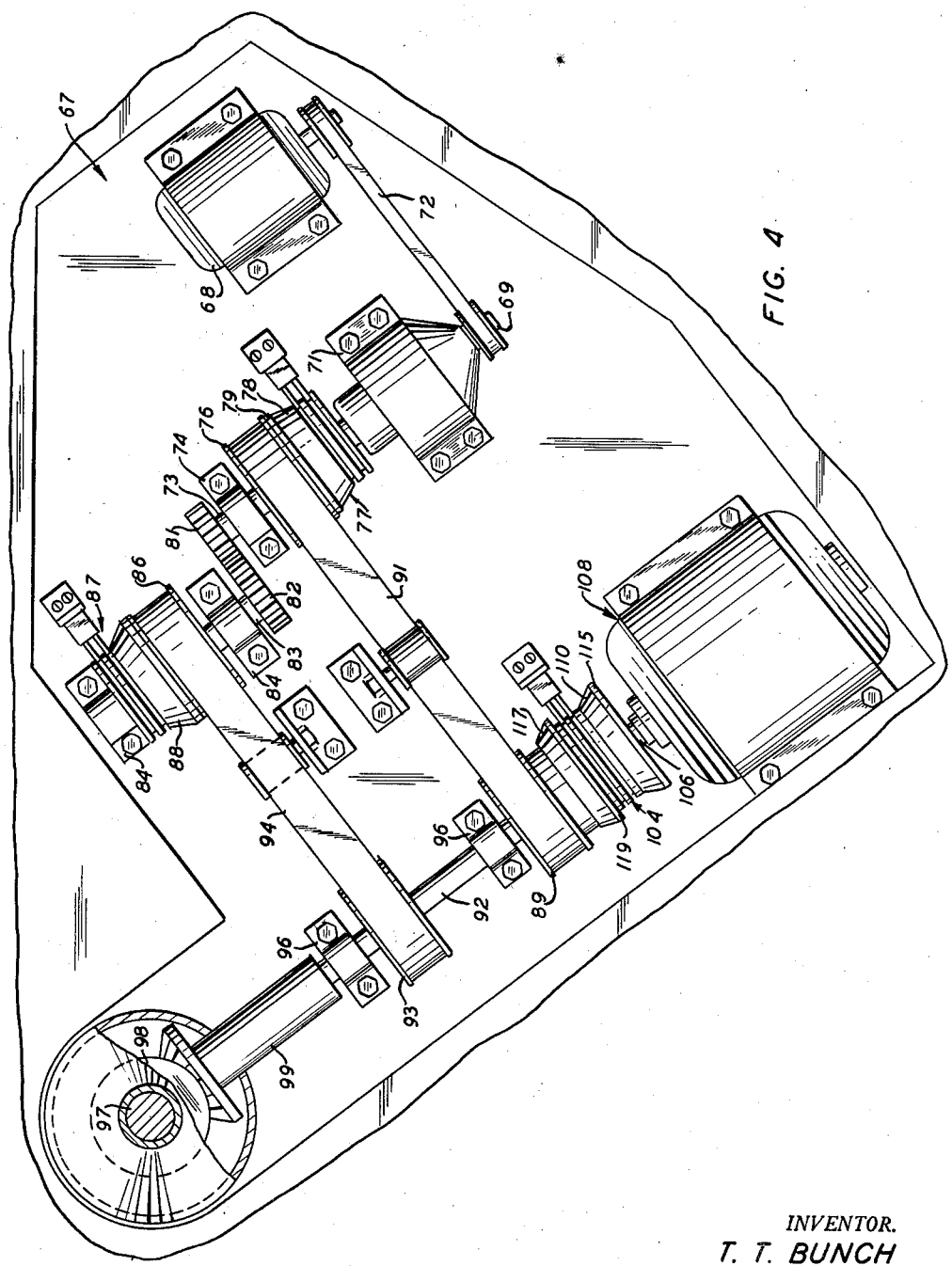

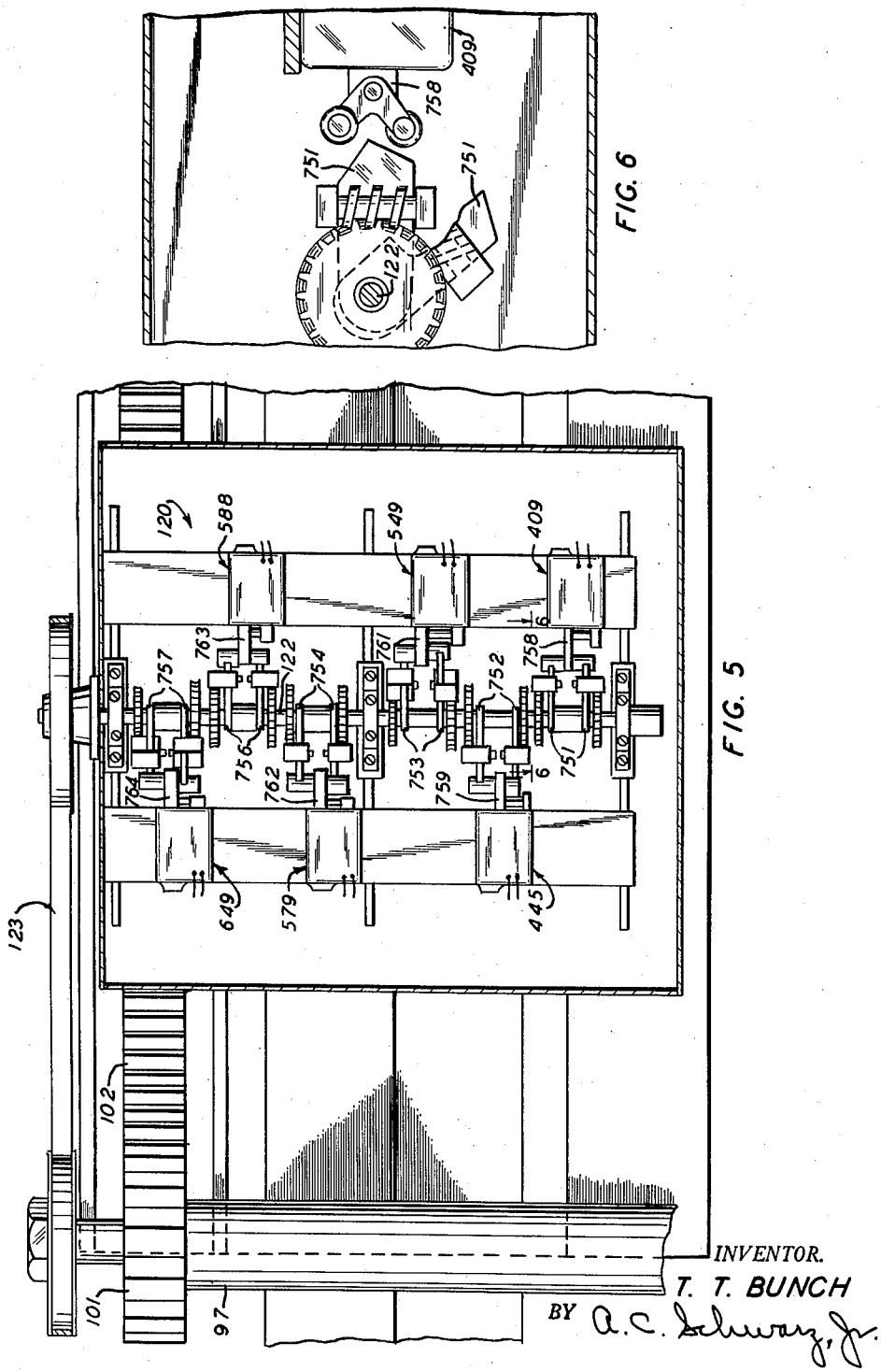

Aug. 11, 1959  T. T. BUNCH  2,899,142
ARTICLE HANDLING APPARATUS
Filed April 5, 1957  14 Sheets-Sheet 9

INVENTOR.
T. T. BUNCH
BY Q.C. Schwarz, Jr.
ATTORNEY

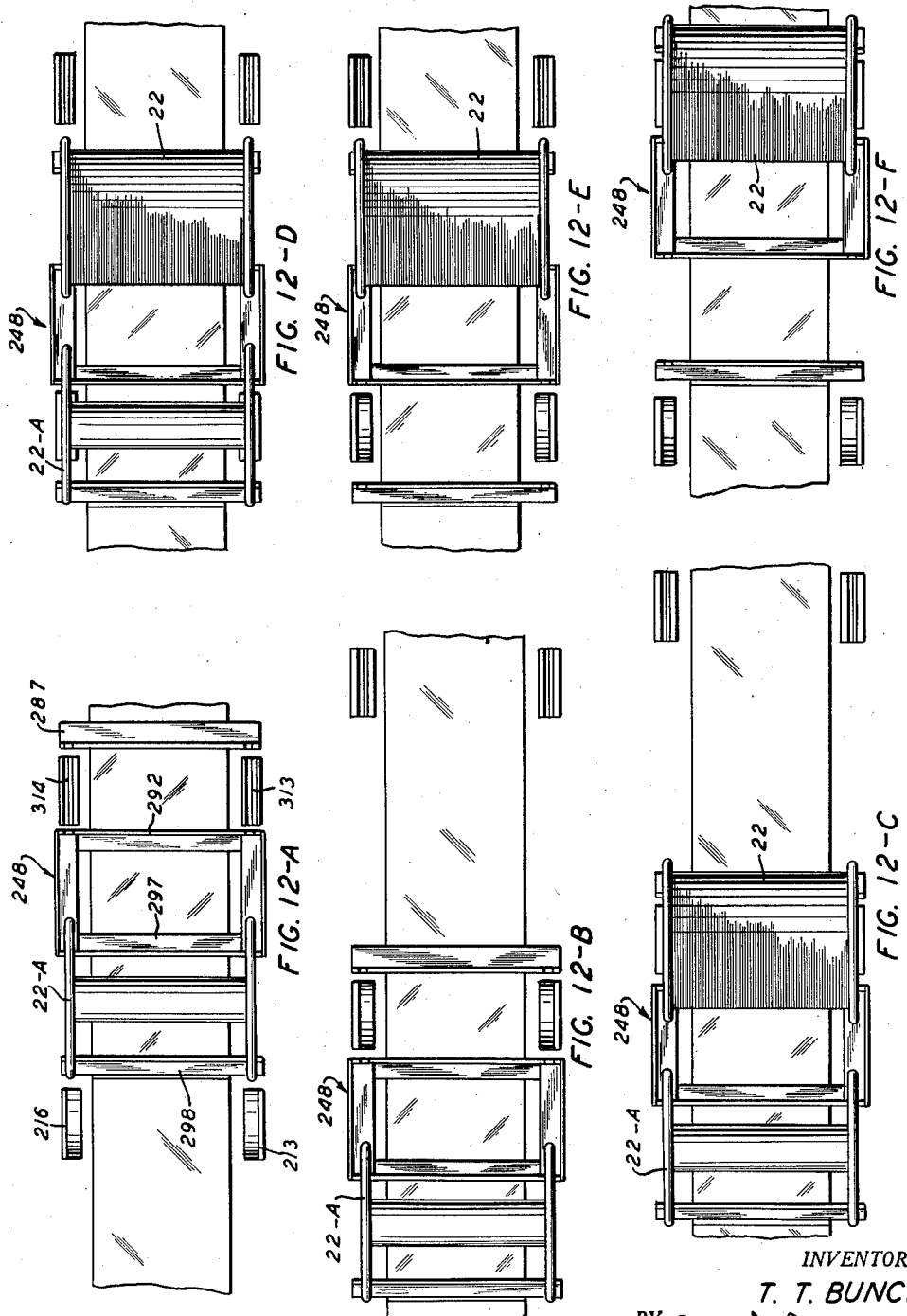

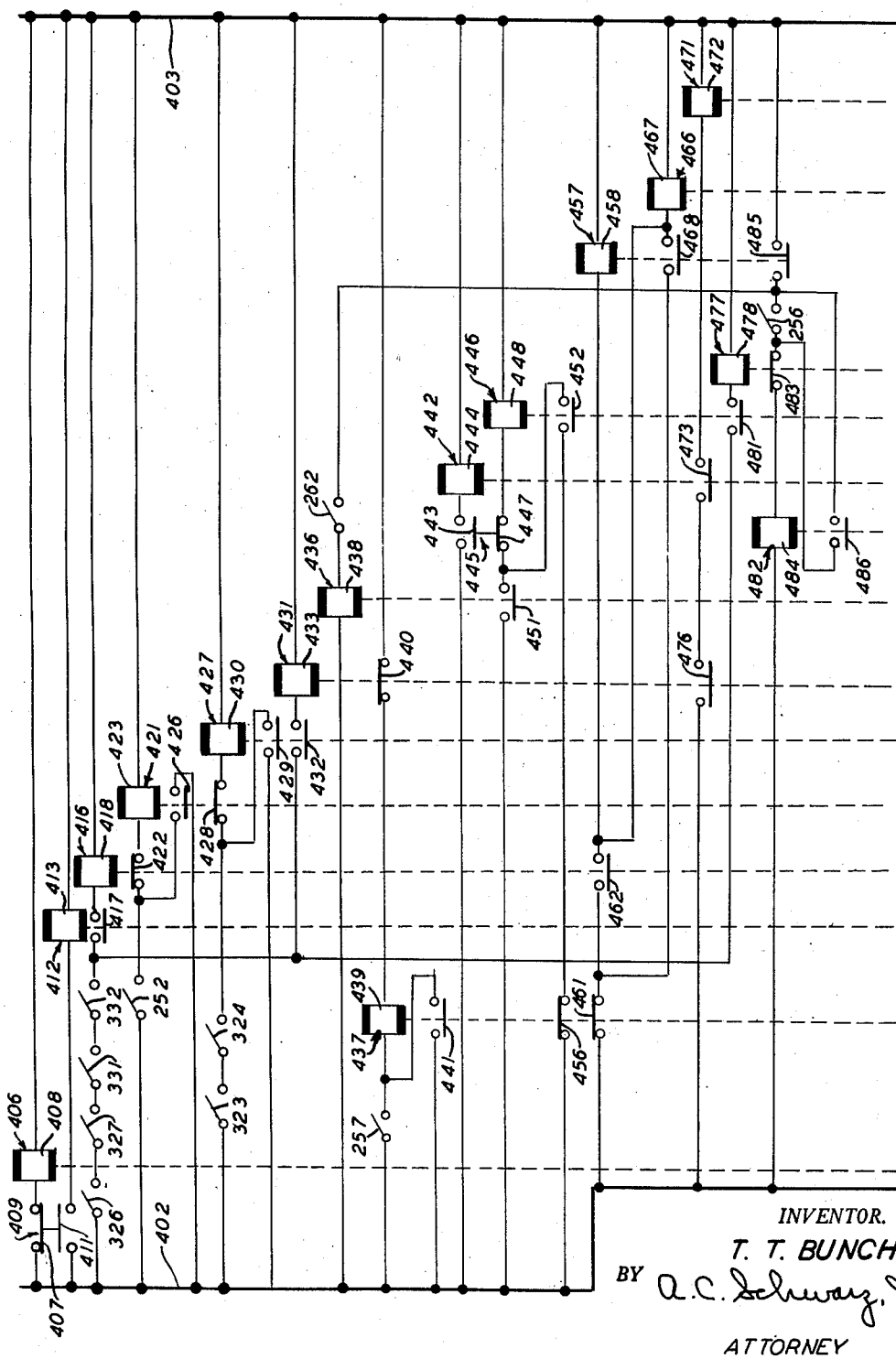
FIG. 13-A
INVENTOR.
T. T. BUNCH
BY a.c. Schwarz, jr.
ATTORNEY

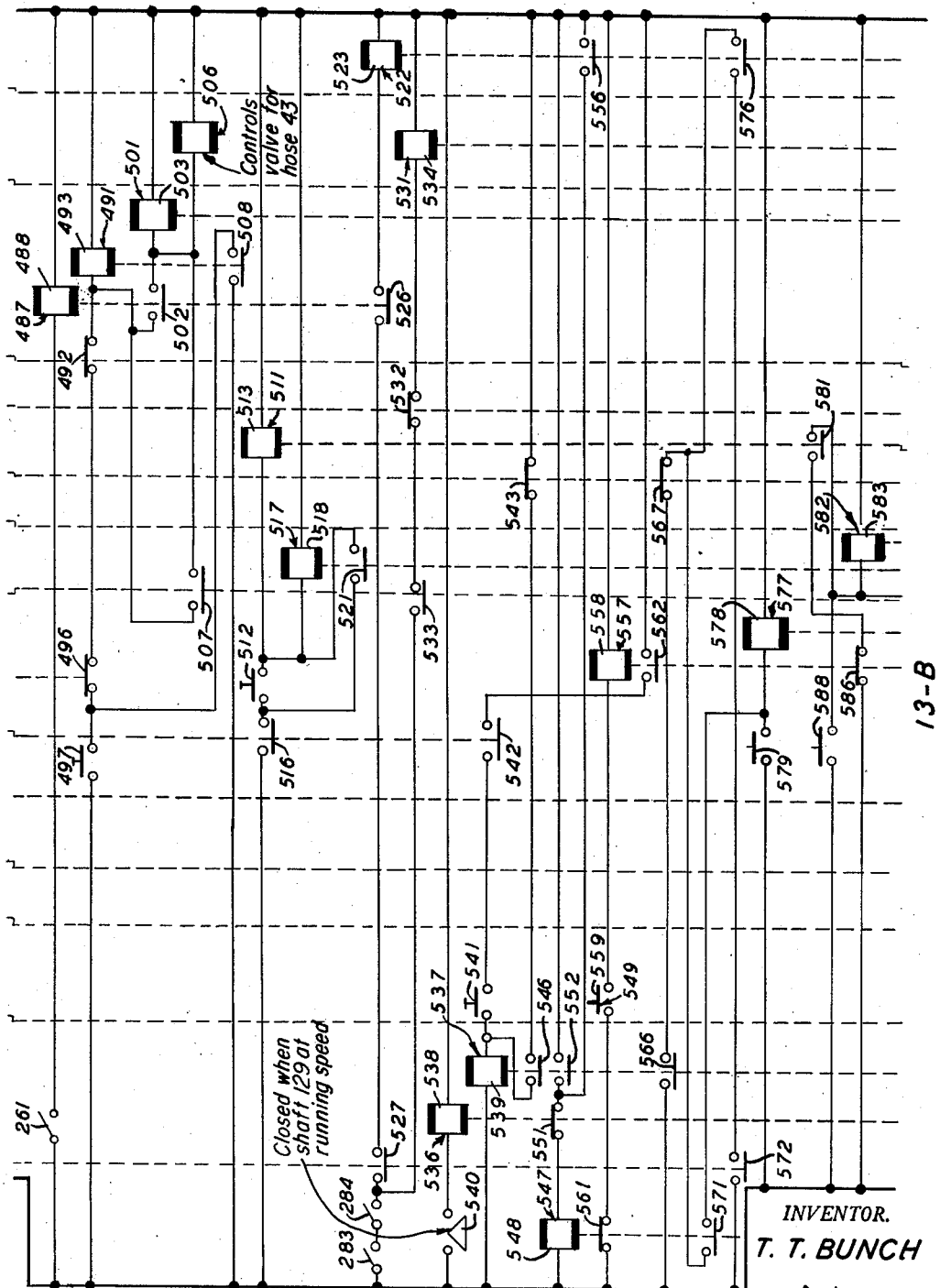

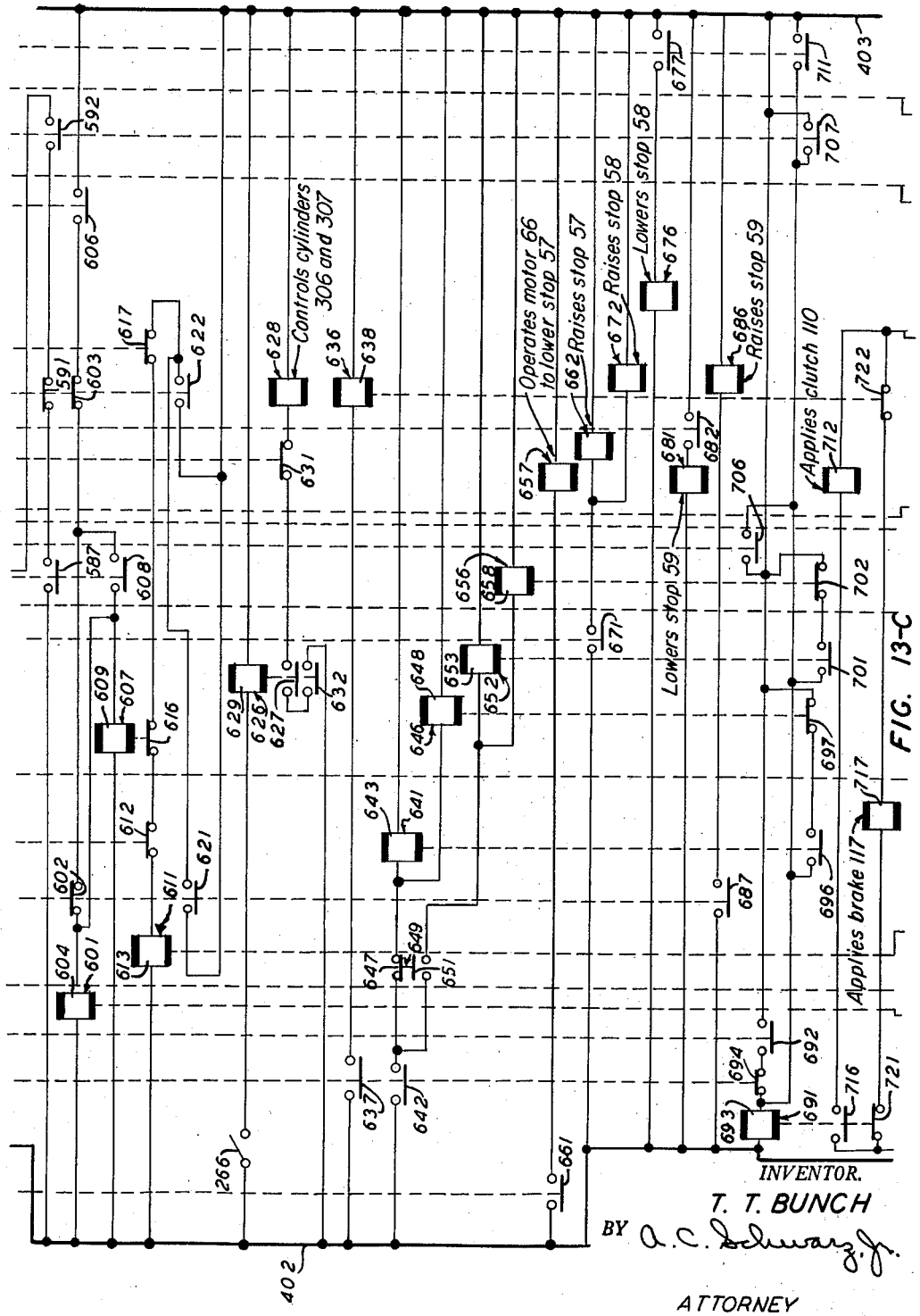
FIG. 13-C

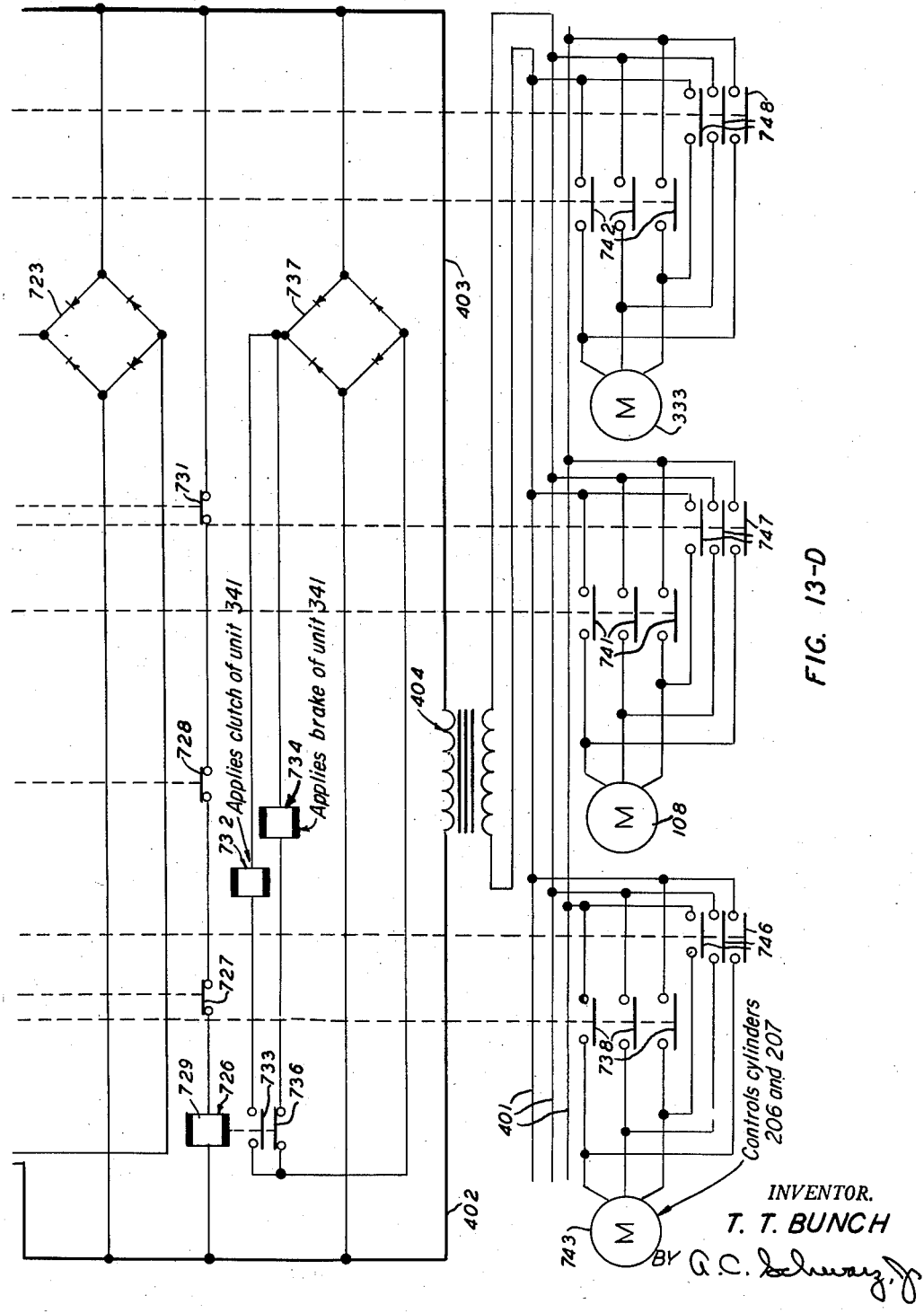

United States Patent Office 2,899,142
Patented Aug. 11, 1959

2,899,142

ARTICLE HANDLING APPARATUS

Tillman T. Bunch, near Ashland, Md., assignor to Western Electric Company, Incorporated, New York, N.Y., a corporation of New York Application April 5, 1957, Serial No. 650,961

14 Claims. (Cl. 242—25)

This invention relates to article handling apparatus, and may more particularly relate to apparatus for loading and unloading stranding apparatus with annular articles, such as reels.

In the manufacture of communications cables, insulated conductors are stranded spirally together individually or in twisted multiples to form a composite multi-conductor cable core over which a suitable covering is applied. Such a cable core may be formed by a stranding machine having a capstan to pace and meter the advance of the conductors and a reel disposed to take the finished cable core after stranding.

In one type of high speed stranding apparatus, the finished cable core is laid around a takeup reel by a rotating cup-like flyer. The takeup reel is mounted coaxially with respect to the rotational axis of the flyer and is reciprocated axially into and out of the flyer to distribute the cable core across its winding surface. The takeup reel is rotated in the direction of rotation of the flyer by the pull of the span of cable core that extends from the rotating flyer to the takeup reel. The tension in the cable core, as it is thus wound, may be controlled by suitably braking the takeup reel, or by suitably driving the takeup reel.

Even though such takeup apparatus can operate at a higher speed than any other takeup apparatus, in its class of magnitude, the advantage of this high speed is lost or lessened if the takeup reel of the apparatus is not loaded and unloaded rapidly. It is desirable that loading and unloading apparatus be provided for such an application that is automatic, fast, safe, rugged and comparatively simple.

Related methods and apparatus to that shown and described herein are disclosed in my copending application Serial No. 624,867, entitled "Methods of and Apparatus for Distributing Strand Material" filed on November 28, 1956, in my copending application Serial No. 624,873, entitled "Methods of and Apparatus for Reeling Strands" filed on November 28, 1956, and in my copending application Serial No. 570,051, entitled "Locking Mechanisms" filed on March 7, 1956.

It is an object of this invention to provide new and improved apparatus for loading and unloading annular articles.

It is another object of this invention to provide new and improved apparatus for loading reels on and unloading reels from strand takeup apparatus.

An apparatus for loading and unloading reels, illustrating certain features of the invention, may include an arbor for receiving a reel and means for supporting the reel. Means are provided for moving the supporting means to a first position where a supported reel is located for insertion and withdrawal of the arbor and to a second position where a reel can be loaded on the supporting means and a reel can be unloaded therefrom. Means are provided for moving the arbor longitudinally and means operable at the second position for reel loading and reel unloading of the reel supporting means. Means are provided, operated by the reel supported means, for actuating the arbor moving means and for actuating the loading and unloading means, whereby a reel can be loaded on the arbor and unloaded therefrom.

A complete understanding of the invention may be obtained from the following detailed description of apparatus forming a specific embodiment of the invention, when read in conjunction with the appended drawings, in which:

Figs. 1–A and 1–B are a composite plan view of stranding apparatus embodying a portion of the features of the invention;

Fig. 2–A is a fragmentary, vertical section taken along the line 2–A—2–A of Fig. 1–B and shows the apparatus in position for winding a strand upon a reel;

Fig. 2–B is a fragmentary, vertical section similar to Fig. 2–A with the exceptions that a carriage drive unit shown in Fig. 2–A is not shown in Fig. 2–B and the apparatus is shown in a different operating position in Fig. 2–B than in Fig. 2–A;

Fig. 3 is a vertical section taken along line 3—3 of Fig. 2–A with certain parts thereof broken away for clarity;

Fig. 4 is an enlarged, horizontal section taken along line 4—4 of Fig. 2–A;

Fig. 5 is an enlarged, fragmentary, vertical section taken along line 5—5 of Fig. 1–B, with parts thereof broken away for clarity;

Fig. 6 is an enlarged, framentary, horizontal section taken along line 6—6 of Fig. 5, with parts broken away for clarity;

Fig. 9 is an enlarged, horizontal section taken along line 9—9 of Fig. 2–A;

Figure 7:
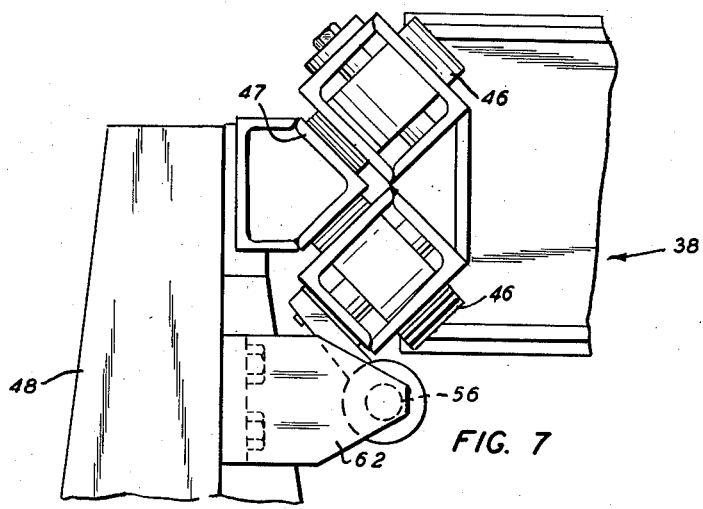
Fig. 7 is an enlarged, fragmentary, vertical section taken along line 7—7 of Fig. 1–B.

Figs. 12–A, 12–B, 12–C, 12–D, 12–E and 12–F are schematic plan views of the above-mentioned loading and unloading mechanism and show that mechanism in its various operating positions;

Figs. 13–A, 13–B, 13–C and 13–D combined as indicated in Fig. 14, are a schematic representation of electrical circuits forming a part of the apparatus, and Fig. 14 is a diagrammatic view showing how Figs. 13–A, 13–B, 13–C and 13–D are arranged to complete the electrical circuit.

Referring now to the drawings, and in particular to Figs. 1–A and 1–B, there is shown stranding apparatus for twisting a plurality of insulated twisted pairs of conductors 11—11 together to form a composite multiconductor cable core 12. The conductors 11—11 are withdrawn from supply reels 13—13 located at the left-hand end of the stranding apparatus, as viewed in Fig. 1–A, and are passed individually about a capstan 14 from whence they are directed to a conventional twisting unit, indicated generally at 16.

The twisting unit 16 is designed to twist the conductors 11—11 together with filler strands 17—17 of jute, or the like, to form the cable core 12. From the twisting unit 16, the cable core 12 advances through a conventional binding head unit, indicated generally at 18, which is designed to apply a covering of suitable textile material about the cable core 12. The covered cable core 12 passes finally to a takeup unit, indicated generally at 19 (Fig. 1–B), which reels the finished cable core upon a rotatable takeup reel 22. The numeral 22, as seen in Figs. 1–B and 2–A, designates a reel being wound in the takeup unit 19 and to be unloaded, when full, as seen in Figs. 12–C to 12–F. The numeral 22–A, as seen in Figs. 2–B, 3, 10 and 12–A to 12–D, designates an empty reel, which is to replace the reel 22 in the takeup unit 19 when the reel 22 is full.

The takeup unit 19 includes a hollow, cup-like flyer 21 which is mounted fixedly, at its base, upon a hollow, rotatable shaft 23 for rotation concentrically about the longitudinally extending, rotational axis of the takeup reel 22. The shaft 23 is supported rotatably by spaced bearing blocks 26—26 mounted on two vertical support columns, one of which designated 27, is shown in Figs. 2–A and 2–B.

As viewed in Figs. 1–A and 1–B, the cable core 12 advances longitudinally from left to right through the hollow shaft 23 to a freely rotatable guide sheave 28 mounted within a longitudinal arcuate cut-out slot 31 (Figs. 2–A and 2–B) formed in the shaft 23. The advancing cable core 12 follows a path around the guide sheave 28 to a pair of longitudinally spaced, freely rotatable guide sheaves 32 and 33 mounted on the outer periphery of the flyer 21. The cable core 12 travels over the guide sheaves 32 and 33 and then radially inward, through an aperture 34 (Figs. 2–A and 2–B) formed in the flyer 21, to the winding surface of the takeup reel 22.

During the reeling operation, the takeup reel 22 (Fig. 2–A) is supported on the free end of a rotatable arbor 36. The arbor 36 is mounted rotatably, in cantilever fashion, on spaced bearings 37—37 mounted fixedly on a movable distributor carriage 38. A pneumatically released latching mechanism, indicated generally at 39, is provided for mounting and locking the takeup reel 22 detachably on the arbor 36 for positive rotation therewith.

The mechanism 39 is described in detail in my above-mentioned copending application entitled "Locking Mechanisms." It is sufficient for the present description to state that a plurality of ball detents 41—41 are movable longitudinally of the arbor 36 by an actuator (not shown) so as to force against the reel 22 and clamp the reel against a conical portion 42 of the arbor (Figs. 2–A and 2–B), or so as to release the reel. The actuation is held in such clamping position by the force of a coil spring (not shown) except when forced by pneumatic action to the releasing position where the ball detents 41—41 are moved away from the reel and retracted into the arbor 36 so as to leave the reel free to be removed from the arbor 36. Pneumatic pressure is supplied for actuation of the actuator by means of a hose 43 prevented from fouling with the carriage 38 by winding upon a constantly tensioned reel 44 similar to a conventional, gasoline station, air hose reel.

The arbor 36 is aligned axially with the rotational axis of the flyer 21 to position the takeup reel 22 concentrically with respect to the flyer 21. The distributor carriage 38 is mounted on opposed pairs of rollers 46—46 for longitudinal movement along and between a pair of spaced, longitudinally extending tracks 47—47, which are supported horizontally on spaced support columns 48—48.

Rigidly secured at either end of the carriage 38 are identical spring bumpers 49 and 51, one of which is shown in enlarged fashion in Fig. 9. The spring bumpers 49 and 51 each have a pair of springs 52 and 53 received therein. The spring 52 acts as a safety device to absorb the kinetic energy of the carriage 38 should the various brakes and motors of the apparatus incorrectly operate so as not to properly control the longitudinal movement of the carriage 38 along the tracks 47—47. During reciprocation of the carriage 38 and the winding of the reel 22, the spring 53 is depressed by the plunger 54 each time the bumpers 49 and 51 strike stop members 56 and 57, respectively. Stop members 58, 59 and 61 are provided for limiting the movement of the carriage 38 and for aiding in positioning the carriage 38 during the loading and unloading cycles.

Figure 8:
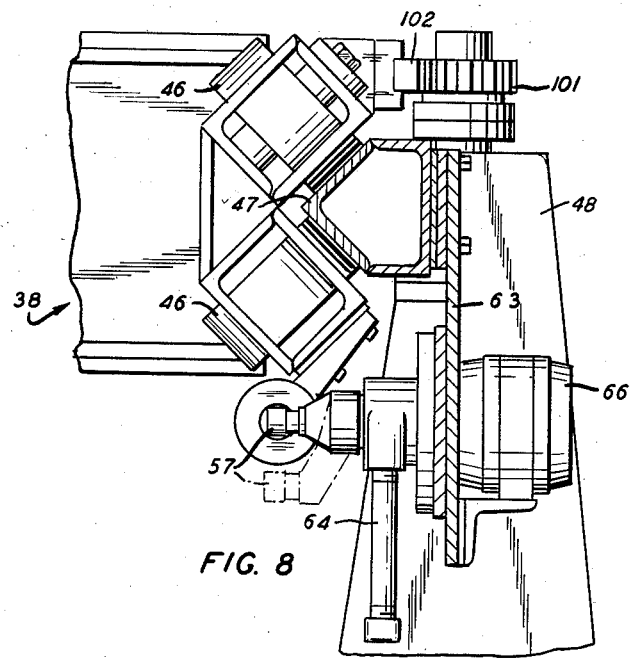
Fig. 8 is an enlarged, fragmentary, vertical section taken along line 8—8 of Fig. 2–A.

The stop member 56 is secured rigidly to a support column 48 (Figs. 1–B and 7) by means of a bracket 62 and remains stationary during the operation of the apparatus, as does the stop member 61 which is secured rigidly to another support column 48. The stop member 57 is attached pivotally to one of the tracks 47—47 by means of a member 63 and can be pivoted to the lowered position shown in phantom lines in Fig. 8 and as shown in solid lines in Fig. 2–B so as to allow the carriage 38 to pass thereby. The stop member 57 is held in its raised position by a spring (not shown) covered by a spring container 64 and also is held in its raised position or pivoted to its lowered position by an electrically actuated, air powered, rotary indexing motor 66.

The stop members 58 and 59 are also arranged to be pivoted to raised and lowered positions in the same manner as stop member 57 for either limiting the movement or for allowing the passing of the carriage 38, respectively. The stop member 58 is so mounted upon the member 63 that when it is raised it may limit the movement of the carriage 38 by engaging the spring bumper 51. The stop member 59 is so mounted on the column 48 that it may limit the movement of the carriage 38 by engaging the spring bumper 49.

A carriage drive unit, indicated generally at 67 and shown in detail in Fig. 4, is designed to drive the carriage 38 reciprocably so as to move the takeup reel 22 axially into (as illustrated in Fig. 2–A) and out of the open end of the flyer 21 so that the convolutions of the cable core 12 are distributed in layers across the winding surface of the takeup reel 22. The carriage drive unit 67 also has the function of driving the carriage 38 to other positions along the longitudinally extending tracks 47—47, one of which positions is shown in Fig. 2–B.

The carriage drive unit 67 (Fig. 4) includes a distributor drive motor 68, preferably a variable speed, D.C., shunt wound motor, which is connected to an input shaft 69 of a gear reducer 71 by a nonslip, zero backlash, drive belt 72. An output shaft 73 of the gear reducer 71 is supported rotatably in a bearing 74 and is provided with a pulley 76, which is either freely rotatable upon the output shaft 73 or connected operatively thereto for rotation therewith by means of an electromagnetic clutch 77, such as a type 825 Warner electric clutch manufactured by Warner Electric Brake & Clutch Co., Beloit, Wisconsin.

The clutch 77 is provided with an electromagnet assembly 78 which is keyed to the output shaft 73 and may be energized to cause engagement with an armature disc 79 mounted directly on the pulley 76 for rotation therewith. Thus, when the clutch 77 is actuated, the pulley 76 is driven rotatably from the output shaft 73. The output shaft 73 is connected by means of the intermeshing gears 81 and 82 to drive a shaft 83 supported rotatably at its opposite ends in bearings 84—84. A pulley 86 is positioned on the shaft 83 and is either freely rotatable thereupon or connected selectively for rotation with the shaft 83 by means of an electromagnetic clutch 87 having an electromagnet assembly 88, which is substantially identical to the assembly 78 of the electromagnetic clutch 77 hereinabove described.

The pulley 76, when connected operatively to the output shaft 73 through its associated electromagnetic clutch 77, drives a pulley 89 through a nonslip, zero backlash, drive belt 91. The pulley 89 is keyed to a drive shaft 92 so that, when the pulley 76 is driven from the output shaft 73, the drive shaft 92 is driven in a forward, counterclockwise direction, as viewed in Fig. 2–A. When the pulley 86 is connected operatively to the shaft 83 by means of its associated electromagnetic clutch 87, a pulley 93 keyed to the drive shaft 92 is driven rotatably through a nonslip, zero backlash, drive belt 94. Since the intermeshing gears 81 and 82 (Fig. 4) reverse the rotation of the shaft 83 with respect to the rotation of the output shaft 73, the drive shaft 92 rotates in the reverse, clockwise direction, as viewed in Fig. 2-A, when the electromagnetic clutch 87 is actuated and the clutch 77 is not operated.

As shown in Fig. 4, the drive shaft 92 is mounted rotatably in a horizontal position on bearings 96—96 and one end thereof is connected to the lower end of a vertically extending drive shaft 97 by means of intermeshing bevel gears 98 and 99. The upper end of the drive shaft 97 is provided with a pinion gear 101 (Figs. 1-B and 3) which is positioned in intermeshing engagement with a horizontally extending, toothed rack 102 secured fixedly to the adjacent side of the movable carriage 38 whereby rotation of the drive shaft 97 in either direction causes corresponding longitudinal movement of the carriage 38 along the tracks 47—47. An electrical circuit and the operation thereof for the actuation and control of the above-described distributor drive motor 68, clutch 77 and clutch 87 is shown and described in my above-mentioned copending application entitled "Methods of and Apparatus for Distributing Strand Material."

The drive shaft 92 (Fig. 4) may be connected selectively through an electromagnetic, clutch-brake coupling 104, such as a type 825 Warner electric clutch-brake coupling, manufactured by the Warner Electric Brake & Clutch Company, to an output shaft 106 of a reversible carriage motor 108. The clutch-brake coupling 104 includes a rotatable electromagnetic clutch 110 which is keyed to the end of the drive shaft 92. When the electromagnetic clutch 110 is energized, an associated paramagnetic clutch disc 115, which is keyed to the output shaft 106 of the motor 108 engages the drive shaft 92 with the output shaft 106 of the motor. The clutch-brake coupling 104 also includes a stationary electromagnetic brake 117 associated with a paramagnetic brake disc 119 which is keyed to the drive shaft 92. When the electromagnetic brake 117 is energized it engages the brake disc 119 to brake the drive shaft 92.

The electromagnetic clutches 77 and 87 and the electromagnetic clutch-brake coupling 104 are controlled by a cam type, switching unit, indicated generally as 120 and shown in detail in Fig. 5, which is provided with a cam shaft 122 which is driven from the drive shaft 97 through a nonslip belt and pulley transmission 123. The switching unit 120 cooperates with an electrical control circuit, shown schematically in Figs. 13-A, 13-B, 13-C and 13-D.

Throughout the operation of the stranding apparatus, the takeup reel 22 is rotated by the flyer 21 through the pull of a portion of the cable core 12 extending from the flyer 21 to the winding surface of the takeup reel. The flyer 21 is driven continuously at a predetermined speed by a main drive motor 125 (Fig. 1-B). The main drive motor 125 is connected by means of a nonslip, pulley and belt transmission 127 to a longitudinally extending, rotatable, main drive shaft 129 (Figs. 1-A and 1-B) which, in turn, is connected by means of a nonslip, pulley and belt transmission 130 to the flyer supporting shaft 23.

An induction machine 135 is mounted to the underside of the distributor carriage 38 and is provided with an output shaft 136, which is connected operatively to the arbor 36 through a toothed, nonslip belt transmission 138. The induction machine 135 is designed to apply a braking torque to the arbor 36, as the cable core 12 is reeled upon the takeup reel, such that a substantially constant tension is maintained in the cable core during an entire reeling operation from an empty reel condition to a full reel condition.

The linear speed of the cable core 12 is maintained substantially constant by virtue of the fact that the capstan 14 about which the conductors 11—11 are wrapped with sufficient turns to prevent slippage, is driven rotatably at a constant predetermined speed from the main drive shaft 129 through a suitable transmission, indicated generally as 140 in Fig. 1-A. For more complete information regarding the induction machine 135 and its use for maintaining a desired value of constant tension on the cable core 12, reference is made to my above-mentioned copending application entitled "Methods of and Apparatus for Reeling Strands."

Referring to Figs. 2-B, 3, 10, 11 and 12-A to 12-F, there is shown a conveyor and elevator unit for removing and replacing the reel 22 upon the arbor 36 at such time as the reel becomes filled. The reel is removed from the arbor 36 and placed upon a conveyor, indicated generally at 201, by the cooperating action of the carriage 38 and a hydraulic lift, indicated generally at 202.

The conveyor 201 acts in a cycle designed to move a full reel from a position over the lowered lift 202 to the right side of the apparatus, as viewed in Fig. 3, for removal of the full reel 22 from the apparatus. The conveyor cycle is further designed to move an empty reel 22-A placed previously on the conveyor 201 from the right side of the apparatus to a position over the lift 202 where it can be placed on the arbor 36 by the cooperative movements of the hydraulic lift 202 and the carriage 38. An air lift, indicated generally at 203, is provided for aiding in removing a full reel from the conveyor and placing an empty reel on the conveyor.

The hydraulic lift 202 comprises a pair of hydraulic cylinders 206 and 207 securely mounted within the lower portion of a pit 208, the cylinders 206 and 207 having pistons 211 and 212, respectively, reciprocably mounted therein. Rigidly mounted upon the ends of the pistons 211 and 212 are a pair of reel engaging members 213 and 216, respectively, each having a reel engaging arcuate recess 217 and 218. The reel engaging member 213 has rigidly secured thereto a vertically depending actuator shaft 221, which has an actuator member 223 rigidly secured to the end thereof. The reel engaging member 216 has rigidly secured thereto a vertically depending actuator shaft (not shown but substantially identical to 221), which has an actuator member (not shown but substantially identical to 223) rigidly secured to the end thereof.

Referring to the conveyor portion of the apparatus, indicated generally at 201, a conveyor belt 227 passes around two belt supporting rollers 228 and 231 keyed, respectively, to shafts 232 and 233, which are rotatably mounted in a pair of pillow block bearings 236—236 and 237—237, respectively. The shaft 233 comprises the drive shaft for the conveyor 201 and is driven at selected intervals during the cycle of operation to position either the full reel 22 or the empty reel 22-A during the loading and unloading operations. The pillow block bearings 236—236 and 237—237 are securely mounted upon bearing supports 238 and 241, respectively, each of which are securely mounted in the upper level of the pit 208.

Figure 10:
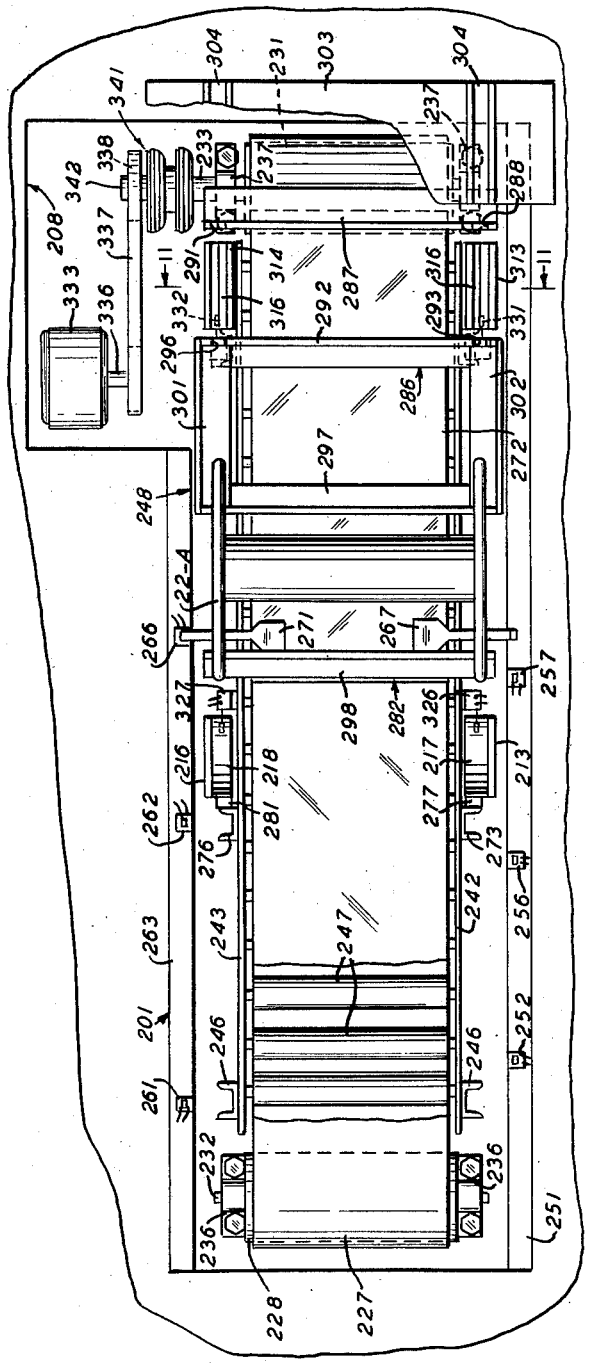
Fig. 10 is a plan view of the loading and unloading mechanism illustrated in Fig. 3, and shows that mechanism in the same operative position as Fig. 3.

A pair of horizontally extending roller mounting members 242 and 243 are securely mounted in the upper portion of the pit 208 by means of angle supports 246—246. Mounted rotatably and side-by-side between the members 242 and 243 are a plurality of rollers 247—247 for supporting the conveyor belt 227 passing thereover and for supporting a conveyor carriage, indicated generally at 248 and rigidly secured to the upper surface of the conveyor belt 227. As seen in Figs. 3 and 10, electrical switches 252, 256 and 257 are mounted along a member 251 securely attached to the side of the pit 208 and are positioned so as to be closed by the passage thereover of an actuator bar 267, which protrudes from the carriage 248. In like manner, electrical switches 261, 262 and 266 are mounted on a similarly attached member 263, on the opposite side of the apparatus as viewed in Fig. 10, and are positioned suitably for closing by the passage thereover of an actuator bar 271, which protrudes from the opposite side of the carriage 248.

It should be noted that the switches 261, 256 and 257 are positioned to the left, as viewed in Figs. 3 and 10, of switches 252, 262 and 266, respectively, and because of the fact that the actuator bars 267 and 271 are rigidly mounted on the carriage 248 in alignment with each other as viewed in Fig. 10, the actuation of the switches 252, 256 and 257 will not be simultaneous with the actuation of switches 261, 262 and 266, respectively.

A mounting angle 273 is rigidly secured to the member 242 and has mounted upon it a guide 277 for the actuator shaft 221 and an electrical switch 283, which is mounted in a position for actuation by the actuator 223. A similar mounting angle 276 is secured to the member 243 and has a similar guide 281 for the actuator shaft of the member 216 and also has a similar switch 284 (seen only in Fig. 13–B), all of which operates in similar manner to the guide 277, shaft 221 and switch 283.

Figure 11:
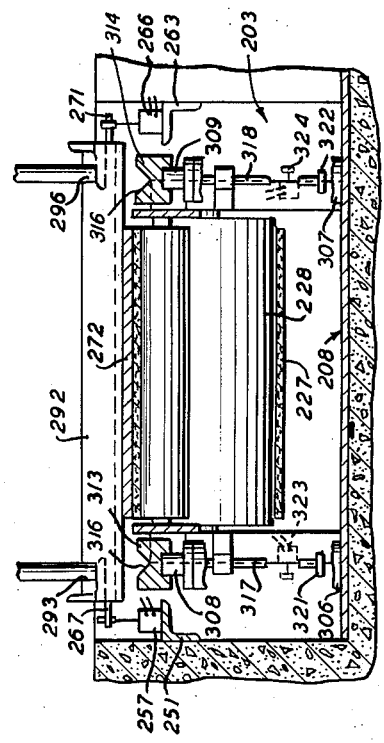
Fig. 11 is an enlarged, vertical section taken along line 11—11 of Fig. 10, with parts thereof broken away for clarity.

The conveyor carriage 248 comprises a plate 272 securely attached to the belt 227 and having a plurality of angles so mounted thereon as to form a pair of cradles 282 and 286 suitable for holding reels. The cradle 286 is formed by a member 287 having reel guiding slots 288 and 291 and by an angle 292 having reel engaging slots 293 and 296, as best seen in Fig. 11. The member 287 and angle 292 are securely mounted upon the plate 272. The cradle 282 is formed in similar fashion by a pair of angles 297 and 298, both of which are mounted upon the plate 272 and both of which are similarly slotted (not shown).

Longitudinally extending angles 301 and 302 are secured upon and within angles 297 and 292 so as to form a trackway at floor level suitable for manually rolling a reel between the cradles 282 and 286. A plate 303 is provided which has an upper surface at floor level, which has reel engaging slots 304—304, and which extends to a position adjacent the carriage 248 when the carriage is in the position shown in Figs. 3 and 10, whereby a reel may be rolled from the floor onto the carriage 248.

As best seen in Fig. 11, the air lift 203 comprises a pair of air cylinders 306 and 307 having pistons 308 and 309, respectively, reciprocally mounted therein, said cylinders being rigidly secured in the upper level of the pit 208. Mounted upon the end of the pistons 308 and 309 are reel engaging members 313 and 314, respectively, each member having a reel engaging straight recess 316. The members 313 and 314 have rigidly secured thereto, vertically depending actuator shafts 317 and 318, respectively, having rigidly secured to the ends thereof actuator members 321 and 322, respectively, which can engage switches 323 and 324, respectively, so as to close them, each switch being mounted upon one of the supports 246—246.

A pair of switches 326 and 327 are secured upon members 242 and 243, respectively, in such positions that they will be actuated when the reel engaging members 213 and 216, respectively, of the hydraulic lift 202 are in down positions. In like manner, switches 331 and 332 are attached to members 242 and 243, respectively, in such a manner that they will be actuated when reel engaging members 313 and 314, respectively, are in down positions. When the reel engaging members 313 and 314 are in up position their recesses 316—316 form, in conjunction with the angles 301, 302 and 287 and the slots 304—304 of the plate 303, a straight trackway to the cradle 282 from the floor at the right of the apparatus, as viewed in Figs. 3 and 10.

A reversible conveyor motor 333 has its output shaft 336 connected by means of a nonslip, zero backlash, drive belt 337 to a head pulley 338. The shaft 233 may be connected selectively through an electromagnetic, clutch-brake unit 341, such as a type 825 Warner electric clutch-brake coupling, manufactured by the Warner Electric Brake and Clutch Company, to a shaft 342 keyed to the pulley 338. The clutch-brake unit 341 includes a clutch comprising a rotatable electromagnetic clutch face and an associated paramagnetic clutch disc, which is keyed to the shaft 342 and also includes a brake comprising a stationary electromagnetic brake face associated with a brake disc which is keyed to the shaft 233. When the electromagnetic clutch is energized, the shaft 233 can be driven positively by the reversible conveyor motor 333 so as to move the conveyor belt 227 and associated conveyor carriage 248. When the electromagnetic brake is energized, the shaft 233 is braked so as to halt the belt 227 and carriage 248 and hold them stationary.

Referring now to combined Figs. 13–A, 13–B, 13–C and 13–D, there is shown a schematic representation of an electrical circuit forming a part of the apparatus. The circuit includes three-phase A.C. bus lines 401—401 (Fig. 13–D) and single phase A.C. lines 402 and 403, which are energized by means of a step down transformer 404 from the bus lines 401—401.

Referring to Fig. 13–A, there is shown a solenoid-operated relay 406 having a coil 408 which may be energized from the lines 402 and 403 by the closure of a normally-closed contact 407 of a cam-operated switch 409 forming a part of the cam-operated switching unit 120 (Figs. 5 and 6), the operation of which will be described in detail hereinafter. An operating coil 413 of a solenoid-operated relay 412 may be energized from the lines 402 and 403 by the closure of a normally-open contact 411 of the cam-operated switch 409.

A coil 418 of a solenoid-operated relay 416 is arranged to be energized when the switches 326 and 327, associated with the hydraulic lift 202, are closed; when the switches 331 and 332, associated with the air lift 203, are closed; and when a series connected normally-open contact 417 of the relay 412 is also closed. An operating coil 423 of a solenoid-operated relay 421 is connected in series with a normally-closed contact 422 of the relay 416 and may be energized from the lines 402 and 403 by the closure of the switch 252, and after being energized it will be held energized by the closed condition of its normally-open contact 426 for as long as the contact 422 remains closed even though the switch 252 may be opened meanwhile.

An operating coil 430 of a solenoid-operated relay 427 may be energized from the lines 402 and 403 through a series connected normally-closed contact 428 of the relay 421 by closing the normally-open switches 323 and 324 associated with the air lift 203. Assuming that the contact 428 remains closed, the relay 427 will not be de-energized by the opening of the switches 323 and/or 324 because a normally-open contact 429 of the relay 427 maintains the circuit. A coil 433 of a relay 431 is arranged to be energized when a normally-open contact 432 of the relay 427 is closed and the switches 326, 327, 331 and 332 are also closed.

An operating coil 438 of a solenoid-operated relay 436 may be connected across the lines 402 and 403 by closure of the normally-open switch 262 (Fig. 10) and closure of a normally-open contact 485 of a solenoid-operated relay 457. The normally-open switch 257 (also Fig. 10) and a normally-open contact 441 of a solenoid-operated relay 437 are connected in parallel with one another so that the switch 257 when closed may energize and the contact 441 may maintain energized an operating coil 439 of the relay 437 through a normally-closed contact 440 of the relay 431. An operating coil 444 of a solenoid-operated relay 442 may be energized from the lines 402 and 403 through the closure of a normally-open contact 443 of a cam-operated switch 445 (Fig. 5).

In its normally-closed position a contact 447 of the cam-operated switch 445 may energize an operating coil 448 of a solenoid-operated relay 446 through a closed normally-open contact 451 of the relay 436. Assuming a normally-closed contact 456 of the relay 437 to be closed and the contact 447 to remain closed, opening of the contact 451 will not de-energize the relay 446 because it will remain locked in through its normally-open contact 452.

A coil 458 of a solenoid-operated relay 457 and a coil 467 of a solenoid-operated relay 466 are connected in parallel with one another from the line 403 and both may be energized through a closed, normally-closed contact 461 of the relay 437 by means of the closure of a normally-open contact 462 of the relay 416. A contact 468 of the relay 457 can maintain the coils 458 and 466 energized even though the contact 462 is opened, assuming the contact 461 to remain closed.

An operating coil 472 of a solenoid-operated relay 471 may be energized from the lines 402 and 403 through the closure of a normally-open contact 473 of the relay 442 and of a normally-open contact 476 of the relay 431. Closing the switches 326, 327, 331 and 332 and a normally-open contact 481 of the relay 446 will energize an operating coil 478 of a solenoid-operated relay 477 from the lines 402 and 403. An operating coil 484 of a solenoid-operated relay 482 may be energized from the lines 402 and 403 through a closed, normally-closed contact 483 of the relay 477, the closed, normally-open switch 256 and the closed, normally-open contact 485 of the relay 457. Assuming the contacts 483 and 485 to remain closed, the opening of the switch 256 will not de-energize the coil 484 because a normally-open contact 486 of the relay 482 will be closed to maintain the connection.

Referring now to Fig. 13-B, the switch 261 (Fig. 10) may be closed so as to energize an operating coil 488 of a solenoid-operated relay 487 from the lines 402 and 403. An operating coil 493 of a solenoid-operated relay 491 may be energized through the closure of a normally-closed contact 492 of the relay 477, of a normally-closed contact 496 of the relay 431 and of a normally-open unload pushbutton contact 497. An operating coil 503 of a solenoid-operated timer relay 501 and a solenoid 506 both may be energized through the closed, normally-open, pushbutton unload contact 497, the closed, normally-closed contact 496 of the relay 431, the closed, normally-closed contact 492 of the relay 477 and either a closed, normally-open contact 502 of the relay 487 or a closed, normally-open contact 507 of the relay 436. The solenoid 506 operates a valve (not shown) which admits air to the hose 43 (Figs. 1-B, 2-A and 2-B) to retract the ball detents 41—41 when the solenoid 506 is energized to permit the full reel 22 to be removed from the arbor 36.

Parallel connected operating coils 513 and 518 of a solenoid-operated timer relay 511 and a solenoid-operated relay 517, respectively, may be energized from the lines 402 and 403 through a closed, series-connected, normally-open contact 516 of the relay 427 and a closed, normally-open arbor advance pushbutton contact 512. Coils 513 and 518 will remain energized after the opening of the switch 512 because of the locking-in of the relay 517 through a closed, normally-open contact 521 of the relay 517. An operating coil 523 of a solenoid-operated relay 522 may be energized from the lines 402 and 403 through a closed, normally-open contact 526 of the relay 487, a closed, normally-open contact 527 of the relay 406, the closed, normally-open switch 283 and the closed, normally-open switch 284, the switches 283 and 284 being associated with the hydraulic lift 202 as earlier described. An operating coil 534 of a solenoid-operated relay 531 may be energized from the lines 402 and 403 through a closed, normally-closed contact 532 of the relay 446, a closed, normally-open contact 533 of the relay 436, the closed, normally-open switch 283 and the closed, normally-open switch 284.

A centrifugally operated, normally-open switch 540, which closes during the rotation of the main drive shaft 129, is connected in series with an operating coil 538 of a solenoid-operated relay 536 and when the switch 540 is closed it energizes the operating coil 538 from the lines 402 and 403. An operating coil 539 of a solenoid-operated relay 537 may be energized by closing a normally-open, main arbor retract, pushbutton contact 541, a normally-open contact 542 of the relay 427 and a normally-open contact 562 of a solenoid-operated relay 557. Assuming a normally-closed contact 543 of the relay 442 to be closed, the release of the main arbor retract switch 541 will not de-energize relay 537 because of its being locked-in by its now closed, normally-open contact 546. An operating coil 548 of a solenoid-operated timing relay 547 may be energized from the lines 402 and 403 through a closed, normally-closed contact 551 of the relay 536 and either a closed, normally-open contact 552 of the relay 537 or a closed-normally-open contact 556 of the relay 522.

A cam-operated switch 549 (Fig. 5) may energize through its closed contact 559 an operating coil 558 of the solenoid-operated relay 557 through a closed, normally-closed, instantaneous closing contact 561 of the timing relay 547. A normally-open contact 566 of the relay 537 and a normally-closed contact 567 of the relay 442 are connected in series and to the line 402 and when both are closed permit energization of an operating coil 578 of a relay 577 through a normally-open, time-to-close contact 571 of the timer relay 547. The coil 578 may also be energized through the contact 571 when closed, a closed, normally-open contact 576 of the relay 522 and a closed, normally-open contact 572 of the relay 406. Alternatively, the coil 578 may be energized from the lines 402 and 403 through closure of a normally-open, cam-operated switch 579 (Fig. 5).

An operating coil 583 of a solenoid-operated relay 582 may be energized from the lines 402 and 403 through either a closed, normally-open, time-to-close contact 581 of the timing relay 511 and a closed, normally-closed contact 586 of the relay 557, or through the closure of a normally-open, cam-operated switch 588 (Fig. 5). Alternatively, the coil 583 may be energized through a series connection of a normally-open contact 592 (Fig. 13-C) of the relay 531, a normally-closed contact 591 of the relay 446 and a normally-open contact 587 of the relay 436 when all are closed.

Referring now to Fig. 13-C, an operating coil 604 of a solenoid-operated relay 601 and an operating coil 609 of a solenoid-operated relay 607 are connected in parallel with each other on the line 402 and may be connected to the line 403 through a closed, normally-closed contact 603 of the relay 446, a closed, normally-open, time-to-close contact 606 of the relay 501 and either a normally-closed contact 602 of the relay 412, when closed or a normally-open contact 608 of the relay 436, when closed, thereby energizing the coils.

An operating coil 613 of a solenoid-operated relay 611 may be energized from the lines 402 and 403 through a normally-closed contact 612 of the relay 416, a normally-closed contact 616 of the relay 607, a normally-closed contact 617 of the relay 477 when these are closed, and when either a normally-open contact 622 of the relay 446 or a normally-open contact 621 of the relay 412 is closed also. The normally-open switch 266 may be closed to energize a coil 629 of a solenoid-operated timing relay 626 from the lines 402 and 403.

A solenoid 628 may be energized through a normally-closed contact 631 of the relay 442, a closed, normally-open, time-to-close contact 627 of the relay 626 and a closed, normally-open instantaneous closing contact 632 also of the relay 626. The solenoid 628 is arranged to actuate a valve (not shown) so as to supply air pressure to the cylinders 306 and 307 of the air lift 203 (Fig. 11), whereby the pistons 308 and 309 may be forced upwardly to raise the members 313 and 314. When the solenoid 628 is de-energized, air pressure is directed by the valve to different ports on the cylinders 306 and 307 so as to lower the members 313 and 314.

A normally-open contact 637 of the relay 536 may be closed to energize an operating coil 638 of a solenoid-operated relay 636 from the lines 402 and 403. An operating coil 643 of a solenoid-operated relay 641 and an operating coil 648 of a solenoid-operated timing relay 646 may be energized through a normally-closed contact 647 of a cam-operated switch 649 (Fig. 5) and a closed, normally-open contact 642 of the relay 536. When the cam-operated switch 649 is operated in the opposite direction, it will energize through its contact 651 both the parallel-connected operating coils 653 and 658 of solenoid-operated relays 652 and 656, respectively, through the closed contact 642 of the relay 536 from the lines 402 and 403.

A solenoid 657 for actuating a valve to admit air to the rotary indexing motor 66 (Fig. 8) to lower the stop member 57 to the position shown in Fig. 2–B, may be energized through the closure of an instantaneous-closing, normally-open contact 661 of the timing relay 547. A pair of parallel-connected solenoids 662 and 672 may be energized from the lines 402 and 403 through the closure of a normally-open contact 671 of the relay 557. The solenoids 662 and 672 actuate pneumatic valves to cause raising of the stop members 57 and 58, respectively, from the positions shown in Fig. 2–B to the positions shown in Fig. 2–A, whereby they can limit the movement of the carriage 38. The closure of a normally-open contact 677 of the relay 522 will energize a solenoid 676 to actuate a pneumatic valve to cause lowering of the stop member 58 to the position shown in Fig. 2–B, so that the carriage 38 may pass thereby. A solenoid 681 may be energized from the lines 402 and 403 through the closure of a normally-open, instantaneous-closing contact 682 of the solenoid-operated relay 511 so as to lower pneumatically the stop member 59 to the position shown in Fig. 2–A. The closure of a normally-open contact 687 of the relay 412 will energize a solenoid 686 from the lines 402 and 403 so as to raise pneumatically the stop member 59 to the position seen in Fig. 2–B. It should be noted that whenever a pneumatic valve associated with the stop members 57, 58 and 59 has been actuated by either the solenoids 657, 676 and 681 (to lower) or the solenoids 662, 672 and 686 (to raise), respectively, that the valve will assume and retain the position into which it is urged until it is actuated in the other direction and caused to assume a new position, which it likewise will retain.

An operating coil 693 of a solenoid-operated relay 691 may be energized through the contacts of any of the following groups: a normally-open contact 692 and a normally-closed contact 694 of the relay 537 and the relay 536, respectively; a normally-open contact 696 and a normally-closed time-to-open contact 697 of the relay 641 and the relay 646, respectively; a normally-open contact 701 and a normally-closed contact 702 of the relays 652 and 656, respectively; a normally-open contact 706 of the relay 517; a normally-open contact 707 of the relay 531; or a normally-open contact 711 of the relay 522.

The input terminals of a bridge rectifier 723 and a bridge rectifier 737 (Fig. 13–D) are connected across the lines 402 and 403. A clutch solenoid 712 forming a part of the electromagnetic clutch 110 (Fig. 4) may be energized from the output terminals of the bridge rectifier 723 through a closed, normally-open contact 716 of the relay 691 so as to connect the drive shaft 92 operatively with the reversible, carriage motor 108. A solenoid 717 forming a part of the electromagnetic brake 117 (Fig. 4) may be energized from the output terminals of the bridge rectifier 723 through a series-connection of a normally-closed contact 722 of the relay 636 and a normally-closed contact 721 of the relay 691, whereby the drive shaft 92 will be braked so as to stop movement of the carriage 38 along the tracks 47—47 (Fig. 3).

Referring now to Fig. 13–D, an operating coil 729 of a solenoid-operated relay 726 may be energized from the lines 402 and 403 through a series connection of a normally-closed contact 727 of the relay 437, a normally-closed contact 728 of the relay 421 and a normally-closed contact 731 of the relay 482.

A conveyor clutch solenoid 732 forming the clutch actuating portion of the clutch-brake unit 341 (Fig. 10) may be energized from the output terminals of the bridge rectifier 737 by closing a normally-open contact 733 of the solenoid-operated relay 726. A conveyor brake solenoid 734 forming the brake actuating portion of the clutch brake unit 341 may be energized from the output terminals of the bridge rectifier 737 by closing a normally-closed contact 736 of the relay 726.

A hydraulic pump motor 743 is arranged to be connected to the three-phase bus lines 401—401 either by closing the open contacts 738—738 of the relay 601 or by closing the normally-open contacts 746—746 of the relay 611. The hydraulic pump motor 743 when energized through the contacts 738—738 runs in a forward direction so as to supply hydraulic fluid to the lower end of the hydraulic cylinders 206 and 207 (Figs. 2–A, 2–B and 3), whereby the pistons 211 and 212 are moved upwardly to raise the members 213 and 216 from the position shown in Fig. 2–A to that shown in Fig. 2–B. Conversely, when the hydraulic pump motor 743 is energized through the contacts 746—746, it runs in a reverse direction so as to supply hydraulic fluid to the upper end of hydraulic cylinders 206 and 207, whereby the pistons 211 and 212 and the members 213 and 216 are lowered back to the positions illustrated in Fig. 2–A.

The reversible carriage motor 108 (Fig. 4) is energized from the bus lines 401—401 by closing the normally-open contacts 741—741 of the relay 577 or by closing the normally-open contacts 747—747 of the relay 582. The reversible motor 108 when energized through the contacts 741—741 runs in a forward direction so as to drive the carriage 38 rightwardly, as viewed in Figs. 1, 2–A and 2–B. Conversely, when the motor 108 is energized through contacts 747—747, it runs in a reverse direction so as to drive carriage 38 leftwardly, as viewed in Figs. 1, 2–A and 2–B.

The conveyor motor 333 (Fig. 10) is energized from the bus lines 401—401 by the normally-open contacts 742—742 of the relay 466 being closed or by the normally-open contacts 748—748 of the relay 471 being closed. The conveyor motor 333 when energized through the contacts 742—742 runs in a forward direction so as to drive the conveyor carriage 248 rightwardly, as viewed in Figs. 3 and 10, and when energized through the contacts 748—748 runs in a reverse direction so as to drive conveyor carriage 248 leftwardly, as viewed in Figs. 3 and 10.

Referring now to Figs. 5 and 6, the switching unit 120 is designed to control the operation of the switches 409, 445 (both Fig. 13–A), 549, 579, 588 (all Fig. 13–B) and 649 (Fig. 13–C) in accordance with the movements of the carriage 38. As mentioned previously, the cam shaft 122 which forms a part of the switching unit 120, is driven from the drive shaft 97. Adjustably mounted on the cam shaft 122 are a plurality of pairs of cams 751—751, 752—752, 753—753, 754—754, 756—756 and 757—757 designed to strike and throw operating levers 758, 759, 761, 762, 763 and 764, respectively, of the switches 409, 445, 549, 579, 588 and 649, respectively, at predetermined positions of the cam shaft 122. The switches 409, 445, 549, 579, 588 and 649 are of the single-pole, double-throw, "snap action" type and, when thrown in one direction, are arranged to remain in that position until thrown in the opposite direction to the other position.

The switch 409 is actuated by one of the pairs of cams 751—751 to open its contact 407 and to close its contact 411 (Fig. 13–A) when the carriage 38, as viewed in Fig. 2–B, reaches a predetermined position near the end of possible rightward travel of the carriage 38. The contact 407 will be closed when the carriage is in the position shown in Fig. 2–B (at the extreme rightward limit of travel). If the carriage 38 is moved leftwardly from the position shown in Fig. 2–B, one of the pairs of cams 751—751 will actuate the switch 409 to close the contact 407 and open the contact 411 when the carriage 38 reaches the above-mentioned predetermined position.

The switch 445 will be actuated by one of the cams 752—752 to open its contact 447 and close its contact 443 when the carriage 38, while moving rightwardly as viewed in Fig. 2–A, reaches a position wherein the reel 22 locked on the arbor 36 by the detents 41—41 is positioned over the hydraulic lift 202. Conversely, when the carriage 38 is moving leftwardly from the position shown in Fig. 2–B, the switch 445 will be actuated by one of the cams 752—752 to open the contact 443 and close the contact 447 as the arbor 36 passes over the hydraulic lift 202. Since it is desirable to stop the carriage 38 with the arbor 36 directly over hydraulic lift 202, the cams 752—752 may be adjusted on the cam shaft 122 so that the switch 445 will be actuated just enough previous to the carriage 38 reaching that position to provide the distance needed for braking.

The switches 579 and 588 are the switches referred to in my above-mentioned copending application entitled "Methods of and Apparatus for Distributing Strand Material" as switches 212 and 217. One of these switches is closed each time the carriage 38 nears the end of a traverse and then is opened again as the carriage 38 goes in its new direction during a winding operation. The function of these two switches is to call for a boost to the carriage 38 so as to have the wrap angle reversed rapidly during winding and is explained fully and in detail in my last-mentioned copending application.

The switch 649 corresponds to switch 230 of my last-mentioned copending application and is actuated in one direction each time the carriage 38 completes a traverse during a winding operation. This switch functions during a winding operation to call alternately for the connection of the belts 91 and 94 (Fig. 4) to the distributor drive motor 68 so as to reciprocate the carriage 38, for winding on the reel 22. The operation of switch 649 is also explained in detail in my last-mentioned copending application.

The switch 549 is actuated by one of the pairs of cams 753—753 to open its contact 559 each time the carriage 38, moving in a rightward direction as viewed in Fig. 2–A, passes a position in which the arbor 36 is just outside of the flyer 21. Conversely, the switch 549 is actuated by one of the pairs of cams 753—753 to close its contact 559 each time the carriage 38, moving leftwardly as viewed in Fig. 2–A, passes a position in which the arbor 36 is just outside of the flyer 21.

In review, the order of actuation of the switches in moving the carriage from the left end of the tracks 47—47 to the right end would be 579, 588, 649, 549, 445 and 409 and in moving in the opposite direction from end to end would be 409, 445, 549, 588, 579 and 649.

*Operation*

Since the operation of the takeup portion of this apparatus has been completely described in my above-mentioned copending applications entitled "Methods of and apparatus for Distributing Strand Material" and "Methods of and Apparatus for Reeling Strands," it will be assumed for the purposes of this explanation that the takeup reel 22, shown near the end of winding in Fig. 2–A, has been filled and is ready for replacement. At this time, the conveyor carriage 248 will be in the position shown in Fig. 12–A and will have an empty reel 22–A thereon as shown in that view.

As the rotating reel 22 comes to a stop after the takeup operation, the centrifugally operated switch 540 (Fig. 13–B), which is closed during rotation of the shaft 129, will be opened so that coil 538 of relay 536 will be de-energized, closing contacts 551 and 694 and opening contacts 637 and 642. Because relay 537 has been locked-in through contacts 543 and 546 by the previous operation of the takeup portion of the apparatus, its contact 692 will be closed and the coil 693 of the relay 691 will be energized from the lines 402 and 403. In the alternative, any suitable apparatus other than the takeup portion may be provided for energizing relay 537. This will result in the contact 716 closing which will energize the solenoid 712 of the electromagnetic clutch 110 so as to engage operatively the reversible carriage motor 108 with the carriage 38. The contact 551 closing will energize the coil 548 of the timer relay 547 through the closed contact 552 of relay 537, thus opening contact 561 and closing contact 661.

The opening of contact 561 will de-energize the coil 558 of the relay 557, which coil was previously energized through the contact 559 of switch 549, thus closing contact 586 and opening contacts 562 and 671. The closing of contact 661 will energize the solenoid 657 to actuate the rotary indexing motor 66 to lower the stop member 57, whereby the carriage 38 can pass the stop member 57. At the same instant the contact 671 opens to de-energize the solenoids 662 and 672, thus allowing the solenoid 657 to operate.

After a short time delay the contact 571 will close energizing the relay 577 through the closed contacts 566 and 567, closing contacts 741—741 so as to run the reversible carriage motor 108 in a forward direction and drive the carriage 38 rightwardly, as viewed in Fig. 2–A. As the carriage 38 moves the arbor 36 and reel 22 mounted thereon out of flyer 21, the contact 647 of switch 649 is closed. Contact 559 of switch 549 is opened by the continued rightward movement of carriage 38. The carriage will be driven until switch 445 is actuated to close contact 443 and open contact 447, the closure of the contact 443 operating to energize the coil 444 of relay 442, which closes the contact 473 and opens the contacts 543, 567 and 631.

The opening of the contact 543 will de-energize the coil 539 of the relay 537 which was previously "sealed in" through the contact 546, thus opening the contacts 546, 552, 566 and 692. The opening of the contacts 566 and 567 will de-energize the coil 578 of the relay 577 so as to open the contacts 741—741, whereby the reversible carriage motor 108 will come to a stop. The opening of the contact 631 will de-energize the solenoid 628 (which was previously energized through the contacts 631, 627 and 632) so as to lower the air lift 203 (Fig. 11), which had previously been in an "up" position to facilitate loading of the empty reel 22–A on the conveyor carriage 248. The opening of contact 552 will de-energize the coil 548 of the relay 547, closing contact 561 and opening contacts 571 and 661.

The opening of contact 692 will de-energize the coil 693 of the relay 691 so as to open contact 716 and close contact 721, whereby the clutch solenoid 712 is de-energized and the brake solenoid 717 is energized to brake the drive shaft 92 and thereby bring the carriage 38 to a stop over the hydraulic lift 202 with the bumper 51 abutting against the raised stop member 58.

During the downward movement of the air lift 203, the members 313 and 314 close switches 331 and 332 and open switches 323 and 324. Because the hydraulic lift 202 is down the switches 26 and 427 are closed and, therefore, the closing of switches 331 and 332 will energize the coil 433 of the relay 431 through the closed contact 432 of the relay 427, the coil 430 of the relay 427 having been held energized through the contact 429 and the normally-closed contact 428 when switches 323 and 324 opened. Because of the energization of the coil 433 of the relay 431, the contacts 440 and 496 will open and contact 476 will close. The coils 418 and 478 of the relays 416 and 477, respectively, will not be energized at this time because the contacts 417 and 481 are open.

The closing of the contact 476 will energize the coil 472 of the relay 471 through the closed contact 473. The energization of the coil 472 of the relay 471 closes the contacts 748—748, whereby the conveyor motor 333 will be started in a reverse direction. The opening of the contact 440 will de-energize the coil 439 of the previously locked-in relay 437, thus opening the contact 441 and closing the contacts 456, 461 and 727. The closing of the contact 727 will energize the coil 729 of the relay 726 which will close contact 733 and open contact 736 to energize the conveyor clutch solenoid 732 and de-energize the conveyor brake solenoid 734. The energization of the clutch solenoid 732 will connect the already started conveyor motor 333 operatively to the shaft 233 so as to start the conveyor carriage 248 moving leftwardly from the position shown in Fig. 12–A. As above-mentioned, it is assumed that an empty takeup reel 22–A is located in the cradle 282, as shown in the Fig. 12–A.

When the conveyor carriage 248 has almost reached the position shown in Fig. 12–B, the switch 252 will be closed momentarily as the actuator bar 267 passes thereover. Because of the closing of the switch 252, the coil 423 of the relay 421 will be energized through the closed contact 422, thus closing the contact 426 and opening the contacts 428 and 728. The closing of the contact 426 "seals in" the relay 421 even though the switch 252 is only momentarily closed.

The opening of contact 428 de-energizes the coil 430 of the relay 427, thus opening contacts 429, 432, 516 and 542. The opening of contact 728 will de-energize the coil 729 of relay 726, closing contact 736 and opening contact 733, whereby the conveyor clutch solenoid 732 is de-energized and the conveyor brake solenoid 734 is energized. The energization of the solenoid 734 causes the brake disc of the clutch-brake unit 341 to be engaged to brake the shaft 233 to stop the carriage 248. The coil 433 of the relay 431 is de-energized by the opening of the contact 432, thus closing the contacts 440 and 496 and opening the contact 476. The opening of the contact 476 de-energizes the coil 472 of the relay 471, which opens the contacts 748—748 so as to stop the conveyor motor 333.

The brake and brake disc of the clutch-brake unit 341 is so adjusted that the carriage 248 will stop when the actuator bar 271 is over the switch 261. If for some reason the carriage 248 does not stop in this position the further operation of the mechanism is prevented, which provides a desirable safety feature. In like manner, the switches 256 and 262 and the switches 257 and 260 are spaced, as viewed in Figs. 3 and 10, for the same reason. Assuming the carriage is braked to a complete stop as the bar 271 closes the switch 261, the coil 488 of the relay 487 will be energized, thus closing the contacts 502 and 526.

After cutting the portion of the strand between the flyer 21 and the full reel 22 and securing the loose ends, the operator closes the unload pushbutton contact 497. The operating coil 493 of the relay 491 is energized through the closed contacts 492 and 496, thus closing the contact 508. The coil 503 of the timing relay 501 and the solenoid 506 are energized through the closed contacts 492, 496, 497 and 502. The solenoid 506 will actuate the air valve associated with the hose 43 so as to retract the ball detents 41—41 (Fig. 2–B).

After a time delay, the contact 606 of the relay 501 will close, energizing the coil 604 of the relay 601 and the coil 609 of the relay 607 through the closed contacts 602 and 603. The hydraulic pump motor 743 will be started in a forward direction by the closure of the contacts 738—738 of the relay 601 so as to supply hydraulic fluid to the cylinders 206 and 207 and start the reel engaging members 213 and 216 moving upwardly toward the reel 22 positioned above them. As the members 213 and 216 start moving upwardly, the switches 326 and 327 are opened. The lift 202 will move upwardly until the lift is in the position shown in Fig. 2–B, in which position the arcuate recesses 217 and 218 in the reel engaging members 213 and 216 engage the flanges of the reel 22 so as to prevent longitudinal movement of the reel.

When each of the reel engaging members 213 and 216 reach their correct up position, the switches 283 and 284 are closed by the actuators 223 and 226. Because the contact 407 of the switch 409 is closed so as to energize the coil 408 of the relay 406, the contact 527 is closed as is the contact 526; therefore, the coil 523 of the relay 522 is energized when the switches 283 and 284 close to close the contacts 556, 576, 677 and 711. The coil 534 of the relay 531 will not be energized when the switches 283 and 284 close because contact 533 of the relay 436 will be open, said relay being unenergized because the switch 262 is open. The closing of the contact 556 will energize the coil 548 of the timing relay 547 through the closed contact 551, opening the contact 561 and closing the contact 661.

The closing of the contact 677 will energize the solenoid 676 to lower the stop member 58 so as to allow the carriage 38 to pass rightwardly thereof, as viewed in Fig. 2–A. The closing of the contact 661 will energize the solenoid 657; however, the stop member 57 has already been lowered by previous energization of this solenoid.

The closing of the contact 711 will energize the coil 693 of the relay 691, closing the contact 716, energizing the solenoid 712 to engage the carriage motor clutch 110 and opening the contact 721, de-energizing the solenoid 717 to disengage the carriage brake 117, whereby the carriage 38 may be driven by the reversible carriage motor 108.

The closing of contact 576 does not immediately energize the coil 578 of the relay 577 because the contact 571 is open; however, after a short time delay the contact 571 closes and energizes the coil 578 of the relay 577, closing the contacts 741—741 so as to start the reversible carriage motor 108 in the forward direction. Because the ball detents 41—41 have been retracted, the carriage 38 and arbor 36 will move rightwardly, as viewed in Fig. 2–A out of the reel 22 to the position shown in Fig. 2–B, leaving the full reel 22 resting upon the reel engaging members 213 and 216.

When the carriage 38 nears such a fully retracted position, switch 409 will be actuated so as to open the contact 407 and close the contact 411 which will de-energize the coil 408 of the relay 406 and will energize the coil 413 of the relay 412, thus closing the contacts 417, 621 and 687 and opening the contacts 527, 572 and 602. The opening of the contact 572 will de-energize the coil 578 of the relay 577, opening the contacts 741—741 so as to stop the motor 108 and stop its driving of the carriage 38 in a rightward direction.

The opening of the contact 527 will de-energize the coil 523 of the relay 522 opening the contacts 556, 576, 677 and 711. The opening of the contact 677 will de-energize the solenoid 676. The coil 548 of the relay 547 will be de-energized by the opening of the contact 556, thus closing the contact 561 and opening the contacts 571 and 661. The opening of the contact 661 de-energizes the solenoid 657. The opening of the contact 711 will de-energize the coil 693 of the relay 691, closing the contact 721 and opening the contact 716 to de-energize the carriage motor clutch solenoid 712 and to energize the carriage brake solenoid 717 bringing the carriage 38 to a stop against the stop member 61 by braking the shaft 92.

The closing of the contact 687 will energize the solenoid 686 which will cause the stop member 59 to be pivoted by air pressure to its raised position, whereby it can limit the carriage 38 from moving past said member 59 in a leftward direction, as viewed in Fig. 2–B.

The opening of the contact 602 will de-energize the coil 604 of the relay 601 so as to open the contacts 738—738 of the hydraulic pump motor 743 which was being driven previously in the forward direction to maintain the hydraulic lift 202 in its "up" position. The opening of the contact 602 also de-energizes the coil 609 of the relay 607 to close the contact 616. The closing of contact 621 energizes the coil 613 of the relay 611 through the closed contacts 612, 616, 617 and 621, thus closing the contacts 746—746 to start the hydraulic pump motor 743 in a reverse direction, lowering the reel engaging members 213 and 216 with the reel 22 thereon.

As the reel engaging members 213 and 216 move in a downward direction, the switches 283 and 284 are opened. When the hydraulic lift 202 nears its "down" position, the switches 326 and 327 will be closed by the reel engaging members 213 and 216. Because the switches 331 and 332 and the contact 417 are closed, the coil 418 of the relay 416 will be energized, thus closing the contact 462 and opening the contacts 422 and 612. The opening of the contact 422 will de-energize the coil 423 of the relay 421, opening the contact 426 and closing the contacts 428 and 728.

The opening of the contact 612 will de-energize the coil 613 of the relay 611 to open the contacts 746—746 so as to stop the hydraulic pump motor 743 and cut off the supply of hydraulic fluid to the cylinders 206 and 207. The reel 22 will now be resting on the carriage 248 in cradle 286 and the conveyor will be positioned as shown in Fig. 12–C.

The coil 467 of the relay 466 will be energized through the closed contact 461 and the now closed contact 462, so as to close the contacts 742—742 starting the reversible conveyor motor 333 in the reverse direction. The closing of the contact 462 will also energize the coil 458 of the relay 457 through the closed contact 461, thus closing the contacts 468 and 485. The coil 729 of the relay 726 will be energized through the already closed contacts 727 and 731 and the now closed contact 728 to close the contact 733 and to open the contact 736, thus energizing the solenoid 732 of the conveyor clutch and de-energizing the solenoid 734 of the conveyor brake to engage the conveyor clutch and to disengage the conveyor brake. The conveyor carriage 248 is now in a position such as is shown in Fig. 12–C; however, because the conveyor clutch is engaged and the conveyor motor 333 is running, the carriage 248 will move rightwardly from that position.

As the conveyor carriage 248 moves rightwardly, the actuator bar 271 will move away from the switch 261 so as to allow it to open and to de-energize the coil 488 of the relay 487, thus opening the contacts 502 and 526. The opening of the contact 502 will de-energize the coil 503 of the timing relay 501, opening the time-to-close contact 606, and also will de-energize the solenoid 506, allowing the ball detents 41—41 to extend under spring force.

The conveyor carriage 248 continues to move rightwardly and the actuator bar 267 closes the switch 256. The coil 484 of the relay 482 will be energized through the closed contacts 483 and 485 and the now closed switch 256, thus closing the contact 486 and opening the contact 731. The opening of the contact 731 de-energizes the coil 729 of the relay 726 to open the contact 733 and close the contact 736 to de-energize the clutch solenoid 732 and energize the brake solenoid 734, thus disengaging the clutch of the conveyor motor 333 and braking the shaft 233. The clutch-brake unit 341 is so adjusted that the braking action thereof will not stop the conveyor carriage 248 immediately, but will allow it to continue its movement for a predetermined distance, as was explained in connection with the switches 252 and 261. Therefore, the conveyor carriage 248 will continue its rightward movement until it is so positioned that the actuator bar 271 will close and maintain closed the switch 262.

The conveyor carriage 248 will then be positioned, as shown in Fig. 12–D, with the empty reel 22–A over the reel engaging members 213 and 216. The coil 438 of the relay 436 will be energized by the closing of switch 262 through the closed contact 485, thus closing the contacts 451, 507, 533, 587 and 608. The closing of the contact 507 will energize the solenoid 506 through the contacts 492, 496 and 508 so as to supply air under pressure to the hose 43 and to retract the ball detents 41—41.

The closing of the contact 507 also will energize the coil 503 of the timing relay 501, which will have no effect at this time; however, after a predetermined time delay, the contact 606 will close to energize the coil 604 of the relay 601 through the closed contacts 603, 606 and 608, thus closing the contacts 738—738 and starting the hydraulic pump motor 333 in a forward direction to supply hydraulic fluid and thereby raise the hydraulic lift 202. The coil 609 of the relay 607 will be energized through the same contacts as was the coil 604, thus opening the contact 616. As the hydraulic lift 202 moves upwardly with the empty reel 22–A thereon, the switches 326 and 327 will open, de-energizing the coil 418 of the relay 416 to open the contact 462 and to close the contacts 422 and 612. The opening of the contact 462 will not de-energize the coils 458 and 467 of the relays 457 and 466, respectively, because the contact 468 of the relay 457 will maintain current flowing through that relay.

As the hydraulic lift 202 reaches its "up" position, switches 283 (Fig. 3) and 284 will be closed by the actuator members 223 and 226. The complete apparatus will appear as shown in Fig. 2–B. The closing of the switches 283 and 284 will energize the coil 534 of the relay 531 through the closed contacts 532 and 533, thus closing the contacts 592 and 707. The closing of the contact 592 will energize the coil 583 of the relay 582 through the closed contacts 587, 591 and 592, thus closing the contacts 747—747 to start the reversible carriage motor 108 in its reverse direction. The closing of contact 707 will energize the coil 693 of the relay 691 to close the contact 716 and to open the contact 721, thus energizing the solenoid 712 and de-energizing the solenoid 717 to engage the carriage motor clutch 110 and to disengage the carriage brake 117, respectively.

The carriage 38 now being in the position shown in Fig. 2–B is driven leftwardly, as viewed in that figure, so that the arbor 36 is moved into the center of the reel 22–A. As the carriage 38 moves in this direction, the switch 409 of the cam-actuated switching unit 120 (Fig. 5) is actuated to close the contact 407 and to open the contact 411, thus energizing the coil 408 of the relay 406 and de-energizing the coil 413 of the relay 412. The energization of the coil 408 of the relay 406 closes the contacts 527 and 572. The de-energization of the coil 413 of the relay 412 opens the contacts 417, 621 and 687 and closes the contact 602. The solenoid 686 will be de-energized by the opening of the contact 687, but the stop member 59 will remain in the raised position. The carriage will continue to move leftwardly until the switch 445 of the cam-actuated unit 120 is reversed and its contact 447 is closed and its contact 443 is opened, thus de-energizing the coil 444 of the relay 442 and energizing the coil 448 of the relay 446 through the closed contact 451. In such a manner, the contacts 473, 532, 591 and 603 will be opened and the contacts 543, 567, 631, 452, 481 and 622 will be closed.

The coil 583 of the relay 582 is de-energized by the opening of the contact 591, thus opening the contacts 747—747 so as to stop the reversible carriage motor 108. The opening of the contact 603 will de-energize the coil 609 of the relay 607 so as to close the contact 616. In like manner, the opening of the contact 532 de-energizes the coil 534 of the relay 531 to open the contacts 592 and 707. The coil 693 of the relay 691 is de-energized by the opening of the contact 707, which causes opening of the contact 716 and closing of the contact 721, which results in energizing the solenoid 717 and de-energizing the solenoid 712, thus disengaging the clutch 110 and engaging the brake 117 to brake the drive shaft 92 and stop the movement of the carriage 38.

The carriage 38 will be positioned correctly over the lift 202 by the bumper 49 striking against the stop member 59 (Fig. 2–B). The opening of the contact 603 de-energizes the coil 604 of the relay 601 to open the contacts 738—738 and stop the forward direction running of the hydraulic pump motor 743 which was maintaining the lift 202 in the up position. Simultaneously, the closing of the contact 622 energizes the coil 613 of the relay 611 through the contacts 612, 616, 617 and 622, thus closing the contacts 746—746 to start the hydraulic pump motor 743 in the reverse direction and to cause it to begin lowering the members 213 and 216 by means of the cylinders 206 and 207.

As the hydraulic lift 202 goes down, the switches 283 and 284 are opened. When the hydraulic lift reaches its "down" position, the reel engaging members 213 and 216 close the switches 326 and 327, thus energizing the coil 478 of the relay 477 through the contact 481 and the switches 326, 327, 331 and 332. The resulting opening of the contact 617 de-energizes the coil 613 of the relay 611 to open the contacts 746—746, to stop the hydraulic pump motor 743 and to stop the feeding of hydraulic fluid to the hydraulic cylinders 206 and 207. The conveyor is now in a position shown in Fig. 12–E with only the full reel 22 thereon.

The contact 483 of the relay 477 opens so as to de-energize the coil 484 of the relay 482 and open the contact 486 and close the contact 731. The contact 492 of the relay 477 opens, de-energizing the coils 493 and 503 of the relays 491 and 501, respectively, so as to open the contacts 508 and 606. The opening of the contact 492 of the relay 477 will also de-energize the solenoid 506 so as to release the pneumatic pressure in the hose 43 and allow the ball detents 41—41 to move into their extended clamping position, thus gripping the reel 22–A between the ball detents 41—41 and the conical portion 42 in the manner illustrated in Fig. 2–A with respect to the reel 22. The closing of contact 731 of the relay 482 energizes the coil 729 of the relay 726, closing the contact 733 and opening the contact 736 to de-energize the solenoid 734 and to energize the solenoid 732 releasing the conveyor brake and engaging the conveyor clutch to drive the conveyor by means of the still forward running motor 333.

As the conveyor moves rightwardly from the position shown in Fig. 12–E, the switch 262 will open as the actuator bar 271 moves away from said switch and the coil 438 of the relay 436 will be de-energized, thus opening the contacts 451, 507, 533, 587 and 608. The opening of these contacts will have no effect except to prepare the circuit for the next unloading cycle.

The conveyor carriage 248 will continue to move rightwardly, as viewed in Fig. 12–E, until the switch 257 is closed by the actuator bar 267. The closing of the switch 257 energizes the coil 439 of the relay 437 through the contact 440 closing the contact 441 and opening the contacts 456, 461 and 727. Even though the conveyor continues to move rightwardly, as viewed in Fig. 12–E, the relay 437 will be sealed in by the closing of the contact 441 and will not open when the switch 257 opens.

The opening of the contact 461 de-energizes the coil 467 of the relay 466 opening the contacts 742—742 so as to stop the conveyor motor 333. The coil 729 of the relay 726 will be de-energized by the opening of the contact 727, thus opening the contact 733 and closing the contact 736 so as to de-energize the solenoid 732 of the conveyor clutch and energize the solenoid 734 to apply braking action to the conveyor. The opening of the contact 456 de-energizes the coil 448 of the relay 446, thus opening the contacts 452, 481 and 622 and closing the contacts 532, 591 and 603. The opening of the contact 481 de-energizes the coil 478 of the relay 477, thus closing the contacts 483, 492 and 617. The closing of the contacts 483, 492, 617 and 483 will have no effect except to prepare the circuit for the next unloading cycle.

The conveyor should come to a stop over the switch 266 (Fig. 10) so as to close that switch and energize the coil 629 of the timing relay 626, thus closing the contact 632. After a time delay the contact 627 closes energizing the solenoid 628 through the closed contact 631. The valve (not shown) is opened by the energization of the solenoid 628 which causes air to be admitted to the air cylinders 306 and 307 of the air lift 203 (Fig. 11) and causes the reel engaging members 313 and 314 to start moving upwardly. The switches 331 and 332 are opened and the switches 323 and 324 are closed by the upward movement of the reel engaging members 313 and 314. The opening of the switches 331 and 332 will have no effect on the relays 416, 431 and 477 because their coils are already de-energized. However, the closing of the switches 323 and 324 will energize the coil 430 of the relay 427 through the contact 428, thus closing the contacts 429, 432, 516 and 542.

At this time the operator enters the flyer 21 and attaches the cable core 12 to the reel 22–A. The operator then closes the arbor advance pushbutton contact 512 (Fig. 12–B) energizing the coil 513 of the timing relay 511 and the coil 518 of the relay 517 through the closed contact 516, thus closing the contacts 521, 682 and 706. Closing of the contact 682 energizes the solenoid 681 to lower the stop member 59. After a time delay the contact 581 of the relay 511 will close energizing the coil 583 of the relay 582 so as to close the contacts 747—747 and start the carriage motor in the reverse direction. The closing of the contact 706 energizes the coil 693 of the relay 691, closing the contact 716 and opening the contact 721 so as to energize the solenoid 712 engaging the carriage motor clutch 110 and to de-energize the solenoid 717 releasing the brake 117 on the drive shaft 92, whereby the carriage 38 moves leftwardly, as viewed in Fig. 1–B, so as to move the reel 22–A into the flyer 21.

As the carriage 38 moves the reel 22–A into the flyer 21, the contact 559 of the cam-operated switch 549 (Fig. 5) is closed energizing the coil 558 of the relay 557 through the contacts 561 and 559, thus closing the contacts 562 and 671 and opening the contact 586. The closing of the contact 671 energizes the solenoids 662 and 672, thus actuating the rotary indexing motors of the stop members 57 and 58 to raise those stop members to their carriage-movement-limiting position. The opening of the contact 586 de-energizes the coil 583 of the relay 582 opening the contacts 747—747 to de-energize the carriage motor 108, thereby to allow the carriage 38 to coast in the direction of the flyer 21.

The apparatus is now in readiness for the takeup operation which has been described in detail in my above-mentioned copending applications entitled "Methods of and Apparatus for Distributing Strand Material" and "Methods of and Apparatus for Reeling Strands." While the takeup operation is taking place, the operator can remove the full takeup reel 22 from the cradle 286 of the conveyor carriage 248 as it is now in the position shown in Fig. 12–F with the reel engaging members 313 and 314 in their "up" position. Similarly, the operator may easily roll another empty reel onto the carriage 248 to the cradle 282 aided by the straight trackway provided when the reel engaging members 313 and 314 are in their "up" position. After the operator places another empty reel upon the carriage 248, the apparatus will be in readiness for another unloading cycle, as above-described, and will appear as shown in Fig. 12–A.

It is to be understood that the above-described arrangements are simply illustrative of the application of the principles of the invention. Numerous other arrange-

What is claimed is:

1. Apparatus for loading and unloading reels, which comprises an arbor for receiving a reel, means for supporting a reel, means for moving said supporting means to a first position where a supported reel is located for insertion and withdrawal of said arbor and to a second position where a reel can be loaded on said supporting means and a reel can be unloaded from said supporting means, means for moving said arbor longitudinally, means operable at the second position for reel loading and reel unloading of said reel supporting means, and means operated by said reel supporting means for actuating said arbor moving means and for actuating said loading and unloading means, whereby a reel can be loaded on said arbor and unloaded from said arbor.

2. Apparatus for loading and unloading reels, which comprises a cantilever arbor upon which a reel can be received, means for supporting a reel, means for moving said supporting means between a position adjacent to said arbor and a position removed from said arbor where a reel can be loaded and a reel can be unloaded from said supporting means, means for moving said arbor longitudinally for insertion in and removal from a reel supported by said supporting means in the adjacent position, means for loading a reel on and unloading a reel from said reel supporting means operable at the removed position, and means for actuating said arbor moving means operated by said supporting means when in the adjacent position and for actuating said loading and unloading means operated by said supporting means when in the removed positon, whereby a reel can be loaded on said arbor and unloaded from said arbor.

3. In winding apparatus including a cup-like flyer and a cantilever reel-mounting arbor mounted coaxially of said flyer so as to extend into said flyer during a reeling operation, the improvement which comprises, means for moving said arbor longitudinally, means for supporting a reel, means for moving said supporting means to and from a position adjacent to said arbor where said supporting means can support a reel located for insertion and withdrawal of said arbor by longitudinal movement thereof, and means operated by said supporting means for actuating said arbor moving means, whereby a reel can be loaded on said arbor and unloaded from said arbor.

4. In winding apparatus including a cup-like flyer and a cantilever reel-mounting arbor mounted coaxially of said flyer so as to extend into said flyer during a reeling operation, the improvement which comprises, means for moving said arbor longitudinally, means for supporting a reel, means for moving said supporting means to and from a position adjacent to said arbor where said supporting means can support a reel located for insertion and withdrawal of said arbor, and control means including means operated by said arbor for actuating said supporting means moving means and including means operated by said supporting means for actuating said arbor moving means, whereby a reel can be loaded on said arbor and unloaded from said arbor.

5. In winding apparatus including a cup-like flyer and a cantilever reel-mounting arbor mounted coaxially of said flyer so as to extend into said flyer during a reeling operation, the improvement which comprises, means for moving said arbor longitudinally into and out of the cup-like flyer, means for supporting a reel, means for moving said supporting means to and from a position adjacent to said arbor where said supporting means can support a reel located for insertion and withdrawal of said arbor, and means operated by said arbor when out of the cup-like flyer for actuating said supporting means moving means and operated by said supporting means when in said adjacent position for actuating said arbor moving means, whereby a reel can be loaded on said arbor and unloaded from said arbor.

6. In winding apparatus including a cup-like flyer and a cantilever reel-mounting arbor mounted coaxially of said flyer so as to extend into said flyer during a reeling operation, the improvement which comprises, means for supporting a reel, means for moving said supporting means between a position adjacent to said arbor where said supporting means can support a reel located for insertion and withdrawal of said arbor and a position removed from said arbor where a reel can be loaded on and a reel can be unloaded from said supporting means, means for moving said arbor longitudinally for insertion in and removal from a reel supported by said supporting means in the adjacent position, means for loading a reel on and unloading a reel from said reel-supporting means operable at the removed position, and means for actuating said supporting means moving means operated by said arbor when out of said cup-like flyer, for actuating said arbor moving means operated by said supporting means when in said adjacent position, and for actuating said loading and unloading means operated by said supporting means when in the removed position, whereby a reel can be loaded on said arbor and unloaded from said arbor.

7. In winding apparatus including a cup-like flyer and a cantilever reel-mounting arbor mounted coaxially of said flyer so as to extend into said flyer during a reeling operation, the improvement which comprises, means for supporting a reel, means for moving said supporting means between a position adjacent to said arbor and a position removed from said arbor where a reel can be transferred to and a reel can be transferred from said supporting means, means for moving said arbor longitudinally for insertion in a reel and removal from a reel supported by said supporting means located in said adjacent position, means for transferring empty reels from a location to said supporting means and for transferring full reels from said supporting means to said location, and control means for actuating said supporting means moving means operated by said arbor when out of said cup-like flyer, for actuating said arbor moving means operated by said supporting means when in said adjacent position, and for actuating said loading and unloading means operated by said supporting means when in the removed position, whereby a reel can be loaded on said arbor and unloaded from said arbor.

8. Apparatus for loading and unloading reels, which comprises a reel-receiving arbor, means for supporting a reel, means for moving said supporting means between a position adjacent to said arbor and a position removed from said arbor where a reel can be transferred to and a reel can be transferred from said supporting means, means for moving said arbor longitudinally for insertion in a reel and removal from a reel supported by said supporting means located in said adjacent position, means for transferring empty reels from a location to said supporting means and for transferring full reels from said supporting means to said location, and means for actuating said arbor moving means operated by said supporting means and for actuating said transferring means operated by said supporting means when in the removed position, whereby a reel can be loaded on said arbor and unloaded from said arbor.

9. Apparatus for loading and unloading reels, which comprises a reel-receiving arbor, a pair of members having arcuate recesses for receiving and supporting a reel therein, hydraulic means for moving said members between a position adjacent to said arbor where said members can support a reel in a location for insertion and withdrawal of said arbor and a position removed from said arbor where a reel can be loaded on said members and a reel can be unloaded from said members, means for moving said arbor longitudinally for insertion in a reel and withdrawal from a reel, conveyor means for transferring empty reels from a second location to said members and for transferring full reels from said members to said second location, and means for actuating said arbor moving means operated by said members when in the adjacent position and for actuating said conveyor means operated by said members when in the removed position, whereby a reel can be loaded on said arbor and unloaded from said arbor.

10. Apparatus for loading and unloading reels, which comprises a reel-receiving arbor, a pair of members having arcuate recesses for receiving and supporting a reel therein, hydraulic means for moving said members between a position adjacent to said arbor where said members can support a reel in a location for insertion and withdrawal of said arbor and a position removed from said arbor, means for moving said arbor longitudinally for insertion in a reel and withdrawal from a reel, a carriage having a first cradle and a second cradle, conveyor means for moving said carriage to a location where a reel can be lifted from said first cradle by said supporting members when moving from the removed position to the adjacent position and for moving said carriage to a location where a reel can be deposited in said second cradle by said members when moving from the adjacent position to the removed position, said conveyor means for moving said carriage also to a position where an empty reel can be placed in said first cradle and a full reel can be removed from said second cradle, and means operated by said members for actuating said arbor moving means and for actuating said conveyor means, whereby a reel can be loaded on said arbor and unloaded from said arbor.

11. Apparatus for loading and unloading reels, which comprises a reel-receiving arbor, a first pair of members having arcuate recesses for receiving and supporting a reel therein, hydraulic means for moving said first members between a position adjacent to said arbor where said first members can support a reel in a location for insertion and withdrawal of said arbor and a position removed from said arbor, means for moving said arbor longitudinally for insertion in a reel and withdrawal from a reel, a carriage having a cradle for an empty reel and a cradle for a full reel, said carriage having a trackway for reels between said empty reel cradle and said full reel cradle, conveyor means for moving said carriage to a location where an empty reel can be lifted from said empty reel cradle by said first members when moving from the removed position to the adjacent position and for moving said carriage to a location where a full reel can be deposited in said full reel cradle by said first members when moving from the adjacent position to the removed position, said conveyor means for moving said carriage also to a position where an empty reel can be placed in said empty reel cradle and a full reel can be removed from said full reel cradle, a second pair of members for supporting a reel, means for moving said second members to a position within said full reel cradle to aid in removal of a full reel and to aid in rolling an empty reel over said full reel cradle to said empty reel cradle, and means operated by said first members for actuating said arbor moving means and for actuating said conveyor means, whereby a reel can be loaded on said arbor and can be unloaded from said arbor.

12. Apparatus for loading and unloading reels, which comprises a reel-receiving arbor, a first pair of members having arcuate recesses for receiving and supporting a reel therein, hydraulic means for moving said first members between a position adjacent to said arbor where said first members can support a reel in a location for insertion and withdrawal of said arbor and a position removed from said arbor, means for moving said arbor longitudinally for insertion in a reel and withdrawal from a reel, a carriage having a cradle for an empty reel and a cradle for a full reel, said carriage having a trackway for reels between said empty reel cradle and said full reel cradle, conveyor means for moving said carriage to a location where an empty reel can be lifted from said empty reel cradle by said first members when moving from the removed position to the adjacent position and for moving said carriage to a locaton where a full reel can be deposited in said full reel cradle by said first members when moving from the adjacent position to the removed position, a loading area, said conveyor means for moving said carriage also to a position adjacent to said area in which position said full reel cradle is between said empty reel cradle and said area, a second pair of members for supporting a reel, means for moving said second members to a position within said full reel cradle to produce a straight trackway between said empty reel cradle and said loading area, and means for actuating said arbor moving means operated by said first members and for actuating said conveyor means operated by said first members and said second members, whereby a reel can be loaded on said arbor and unloaded from said arbor.

13. Apparatus for loading and unloading reels, which comprises an arbor for receiving a reel, detent means mounted in the arbor and normally extending therefrom for gripping a reel received upon the arbor, means for retracting said detent means into said arbor for allowing a reel to be removed from said arbor, means for supporting a reel, means for moving said supporting means to a first position where a supported reel is located for insertion and withdrawal of said arbor and for moving said supporting means to a second position where a reel can be loaded on said supporting means and a reel can be unloaded from said supporting means, means for moving said arbor longitudinally, means operable at the second position for reel loading and reel unloading of said reel-supporting means, and control means for actuating said retracting means operated by said unloading means and by said arbor, said control means also operated by said reel-supporting means for actuating said arbor moving means and for actuating said loading and unloading means, whereby a reel can be loaded on and unloaded from said arbor.

14. In winding apparatus including a cup-like flyer and a cantilever reel mounting arbor mounted coaxially of said flyer so as to extend into said flyer during a reeling operation, said arbor having detent means mounted in said arbor and normally extending therefrom for gripping a reel received upon said arbor, and means for retracting said detent means into said arbor for allowing a reel to be removed from said arbor, the improvement which comprises, means for supporting a reel, means for moving said supporting means to and from a predetermined position adjacent to said arbor where said supporting means can support a reel in a location for introduction and withdrawal of said arbor, means for moving said arbor longitudinally to locations outside and inside of the cup-like flyer, and control means for actuating said retracting means operated by said arbor when out of the cup-like flyer, said control means for actuating said arbor moving means also operated by said supporting means, whereby a reel can be loaded on said arbor and unloaded from said arbor.

References Cited in the file of this patent

UNITED STATES PATENTS

| | | |
|---|---|---|
| 1,980,138 | Johnson et al. | Nov. 6, 1934 |
| 2,175,755 | Matteson | Oct. 10, 1939 |
| 2,351,669 | Dentzer et al. | June 20, 1944 |
| 2,527,667 | Wood | Oct. 31, 1950 |